US009583964B2

(12) United States Patent
Murayama et al.

(10) Patent No.: US 9,583,964 B2
(45) Date of Patent: Feb. 28, 2017

(54) POWER RECEIVING DEVICE, POWER TRANSMITTING DEVICE, WIRELESS POWER TRANSFER SYSTEM, AND WIRELESS POWER TRANSFER METHOD

(75) Inventors: Yuji Murayama, Tokyo (JP); Hiroaki Nakano, Tokyo (JP); Shinichi Fukuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 986 days.

(21) Appl. No.: 13/613,064

(22) Filed: Sep. 13, 2012

(65) Prior Publication Data

US 2013/0076153 A1 Mar. 28, 2013

(30) Foreign Application Priority Data

Sep. 26, 2011 (JP) .................................. 2011-209241

(51) Int. Cl.
*H02J 7/02* (2016.01)
(52) U.S. Cl.
CPC .................................. *H02J 7/025* (2013.01)
(58) Field of Classification Search
CPC ................................ H02J 5/005; H01F 38/14
USPC ........................................................ 307/104
See application file for complete search history.

(56) References Cited

U.S. PATENT DOCUMENTS

| 2007/0228833 A1* | 10/2007 | Stevens | H02J 5/005 307/45 |
| 2009/0322280 A1 | 12/2009 | Kamijo et al. | |
| 2010/0320962 A1 | 12/2010 | Sekita et al. | |
| 2011/0140537 A1* | 6/2011 | Takei | H04B 5/0012 307/104 |

FOREIGN PATENT DOCUMENTS

| EP | 2552030 A | 1/2013 |
| JP | 2011-152008 | 8/2011 |
| WO | 2005/109597 A | 11/2005 |
| WO | 2011/006876 A2 | 1/2011 |

OTHER PUBLICATIONS

The Chinesse Office Action Application No. 2012103509438; Issued Oct. 9, 2015 in English.
European Extended Search Report Received for European Patent Application No. 12006566.9, mailed on Jan. 4, 2017, p. 8.

* cited by examiner

*Primary Examiner* — Thienvu Tran
*Assistant Examiner* — David M Stables
(74) *Attorney, Agent, or Firm* — Chip Law Group

(57) ABSTRACT

A power receiving unit includes a communication unit, a control unit, a detecting unit that performs metallic foreign matter detection, and a charge storage unit. The control unit is configured to control charging so electric power is stored in the charge storage unit for consumption by the detecting unit during Q-value measurement when the control unit receives a Q-value measurement command from the power transmitting device through the communication unit.

9 Claims, 18 Drawing Sheets

POWER RECEIVING DEVICE, POWER TRANSMITTING DEVICE, WIRELESS POWER TRANSFER SYSTEM, AND WIRELESS POWER TRANSFER METHOD

BACKGROUND

The present disclosure relates to a power receiving device, a power transmitting device, a wireless power transfer system, and a wireless power transfer method that detect the presence of a conductor such as a metal.

Recently, wireless power transfer systems, which contactlessly transmit electric power (transmit electric power by wireless), are being actively developed. In the wireless power transfer unit, an alternating signal is input to a power transmitting coil in a power transmitting device to generate an alternating magnetic field; a power receiving coil in a power receiving device receives the alternating magnetic field, and an alternating signal is retrieved to transfer (supply) and electric power by wireless.

FIG. 1 schematically illustrates an example of the structure of a wireless power transfer system.

The wireless power transfer system 1 in FIG. 1 includes a power transmitting device 10 on a primary side and a power receiving device 20 on a secondary side.

The power transmitting device 10 includes, as an example, a power transmitting coil 11, a resistive element 12, and an alternating power supply 13, which outputs alternating signals. In the power transmitting device 10, an alternating signal is input from the alternating power supply 13 to the power transmitting coil 11 to generate an alternating magnetic field.

The power receiving device 20 includes, as an example, a power receiving coil 21, a capacitor 22 connected in parallel to the power receiving coil 21, a rectifying and smoothing unit 23, a regulator 24, and a power receiving target 25.

In the power receiving device 20, the power receiving coil 21 receives the alternating magnetic field generated in the power transmitting device 10 by, for example, a magnetic resonance method and an alternating signal is retrieved through a resonance circuit including the power receiving coil 21. The retrieved alternating signal is converted into a direct-current signal by being rectified and smoothed by the rectifying and smoothing unit 23. The regulator 24 uses the converted direct current signal to generate a constant voltage, and supplies the generated constant voltage to the power receiving target 25 such as a battery.

Usually, the wireless power transfer unit also carries out communication between the power transmitting device and the power receiving device for control purposes while transferring electric power. As the communication method, alternating signals to be transferred are often subjected to amplitude modulation (for example, amplitude shift keying (ASK)) during data communication.

FIG. 2 illustrates an example of a structure in which data is transmitted from the power transmitting device 10 (primary side) to the power receiving device 20 (secondary side). In FIG. 2, elements that are the same as in FIG. 1 will be given the same reference numerals.

In the power transmitting device 10, a parallel circuit formed with a resistive element 14R and a switch 14S is added to the data transmission structure in FIG. 1 between the power transmitting coil 11 and the alternating power supply 13, and a communication and control unit 16 is also included.

When data is transmitted from the power transmitting device 10, the amplitude of an alternating signal generated by the alternating power supply 13 is directly changed. Specifically, to perform amplitude modulation of the alternating signal generated by the alternating power supply 13, the communication and control unit 16 makes a switchover between the open state and closed state of the switch 14S according to the transmission data string (baseband signal).

In the power receiving device 20, a demodulation circuit 26 and a communication and control unit 27 are added to the data reception structure in FIG. 1.

When the power receiving device 20 receives data, the amplitude modulated alternating signal is rectified and smoothed by the rectifying and smoothing unit 23, the resulting direct-current signal is demodulated by the demodulation circuit 26, and a reception data string (baseband signal) is extracted. The reception data string is analyzed by the communication and control unit 27.

FIG. 3 illustrates an example of a structure in which data is transmitted from the power receiving device 20 (secondary side) to the power transmitting device 10 (primary side). In FIG. 3, elements that are the same as in FIGS. 1 and 2 will be given the same reference numerals.

In the power receiving device 20, a series circuit formed with a resistive element 28R and a switch 28S is added to the data transmission structure in FIG. 1 in parallel to the power receiving coil 21, and the communication and control unit 27 is also included.

When data is transmitted from the power receiving device 20 to the power transmitting device 10, the so-called load modulation method is usually used. Specifically, to change the value of the load resistive component parallel to the power receiving coil 21, the communication and control unit 27 makes a switchover between the open state and closed state of the switch 28S according to the transmission data string (baseband signal). The alternating signal output from the power transmitting device 10 is thereby amplitude modulated, enabling the power transmitting device 10 to observe the transmission data string transmitted from the power receiving device 20.

In the power transmitting device 10, a modulation circuit 15 and the communication and control unit 16 are added to the data transmission structure in FIG. 1.

When the power transmitting device 10 receives data, the amplitude modulated alternating signal received by the power transmitting coil 11 is demodulated by the modulation circuit 15 and a reception data string (baseband signal) is extracted. The reception data string is analyzed by the communication and control unit 16.

Another possible communication method is to use a short-distance wireless communication standard such as Bluetooth® or ZigBee® with a frequency different from the frequency of the supplied alternating signal. The above communication method, in which the supplied alternating signal is amplitude modulated, is usually used because the number of parts used can be reduced, the hardware can be simplified, and the number of frequencies used can be reduced to one.

The power receiving device 20 usually uses electric power received from the power transmitting device 10 to operate digital circuits, a microcomputer, and other elements intended for communication and control. When the power receiving coil 21 is moved apart from the power transmitting coil 11, therefore, the power supply of the power receiving device 20 is turned off.

FIG. 4 is a flowchart illustrating an ordinary example of the operation of the digital circuits, the microcomputer (control unit), and the like when the power transmitting device (primary side) and power receiving device (secondary side) perform communication for control purposes to transmit electric power (to, for example, a battery).

In the examples in FIGS. 2 and 3, the control unit is equivalent to the communication and control unit 16 in the power transmitting device 10 and to the communication and control unit 27 in the power receiving device 20.

When the user or another person turns on the power supply of the primary side (step S1), the primary side carries out object detection (step S2). When the user makes the secondary coil face the primary coil, the secondary side is detected by the primary side as an object (steps S5 and S6). The primary side decides whether any object has been detected (step S3). If some kink of object has been detected, the sequence proceeds to step S4. If no object has been detected, the sequence returns to step S2.

If an object has been detected in step S3, the primary side starts to transmit electric power (step S4). The power supply of the secondary side is turned on by the electric power transmitted from the primary side (step S7).

Next, the primary side and the secondary side mutually communicate to exchange their ID numbers (identification information) (step S8). To assure safety, the primary side and secondary side then carry out mutual authentication by using authentication keys (step S9). The primary side decides, from the authentication result, whether the secondary side is a correct remote party (step S10). If the secondary side is not a correct remote party, the primary side suspends the power transmission and the secondary side stops the operation without performing charging (step S14). It suffices to perform the mutual authentication only once after the power supplies of the primary side and secondary side have been turned on.

If communication between the primary side and the secondary side is discontinued or fails in step S8 or S9, the primary side suspends the power transmission (step S15) and the power supply of the secondary side is turned off, after which the sequence returns to step S2.

If the primary side can decide that the secondary side is a correct remote party, the primary side transmits electric power to the secondary side to allow the secondary side to charge the battery. If metallic foreign matter enters a clearance between the coil on the primary side and the coil on the secondary side, an eddy current flows in the metallic foreign matter, generating heat. To prevent this, the secondary side carries out metallic foreign matter detection before starting charging.

That is, if the primary side decides that the secondary side is a correct remote party in step S10, the primary side or secondary side carries out metallic foreign matter detection (step S11); when the secondary side carries out metallic foreign matter detection, it uses the electric power transmitted from the primary.

Then, the primary side or secondary side decides whether metallic foreign matter has been detected (step S12).

If no metallic foreign matter has been detected, the secondary side supplies the electric power received from the primary side to the power receiving target to perform battery charging (step S13). It is difficult to know a time at which metallic foreign matter intrudes. To perform metallic foreign matter detection repeatedly during charging at fixed intervals, therefore, the sequence returns to step S11.

If metallic foreign matter has been detected, the primary side suspends the power transmission and the secondary side does not perform battery charging (step S14).

If, for example, the user carries away the secondary side after authentication has succeeded in step S9, the secondary side fails to receive electric power and the power supply of the control unit on the secondary side is turned off. After that, even if the power supply of the secondary side is turned on again, ID number exchanging and authentication become necessary again. That is, once the power supply of the secondary side is turned off, a restart from the initial state becomes necessary. If communication between the primary side and the secondary side is discontinued or fails in step S11 or S13, therefore, the power transmission by the primary side is suspended (step S15) and the power supply of the secondary side is turned off, after which the sequence returns to step S2.

A series of processing described above is applied to charging carried out between one power transmitting device (primary side) and one power receiving device (secondary side), that is, so-called one-to-one charging.

When so-called multiple power transmission, in which one primary side charges a plurality of secondary sides, is carried out, the primary side first uses a polling command to acquire the ID number from each secondary side. The primary side then transmits authentication, control, and charging commands with an ID number specified to carry out one-to-one communication with the secondary side. Thus, the primary side can carry out authentication, control, and charging for a particular one of the plurality of secondary sides.

Japanese Unexamined Patent Application Publication No. 2011-152008, for example, describes a transfer system that performs authentication between a host (primary side) 11 and a device (secondary side) 12 before it becomes ready to transmit electric power used for data communication and device operation.

In the transfer system described in Japanese Unexamined Patent Application Publication No. 2011-152008, the host 11 intermittently transmits second electric power, which is less than first electric power transmitted when data communication is carried out, together with a response request signal. If the host 11 then receives a response from the device 12, the host 11 transmits third electric power, which is more than the second electric power and less than the first electric power, to the device 12 together with a response request signal. If a charging completion signal is included in the response from the device 12, the host 11 carries out authentication processing. If authentication succeeds, the host 11 transmits the first electric power to the device 12. If the device 12 receives the electric power from the host 11 together with a response request signal, the device 12 transmits, to the device 11, a response including a signal indicating whether charging has been completed.

SUMMARY

If, for example, the user carries away the secondary side after authentication has succeeded between the primary side and the secondary side, the secondary side fails to receive electric power from the primary side. Once the power supply of the control unit on the secondary side is turned off, even if the power supply of the secondary side is turned on again, ID number exchanging and authentication become necessary again. That is, once the power supply of the secondary side is turned off, a restart from the initial state becomes necessary.

If communication between the primary side and the secondary side is discontinued or fails, it becomes necessary that the primary side suspends power transmission and the power supplies of all the plurality of secondary sides are turned off, after which the primary side restarts power transmission and carries out acquisition of the IDs of all the secondary sides and authentication again.

On the secondary side, electric power charged in a large battery, which is the power receiving target, may be used to carry out authentication, control, charging, and other operations. If the battery is dead, however, the secondary side fails to carry out these operations. The secondary side also fails to detect metallic foreign matter in its vicinity, in which case safety fails to be assured, so the primary side does not transmit electric power, preventing the battery from being charged.

In the present disclosure, when one primary side transmits electric power to a plurality of secondary sides, even if power transmission from the primary side is suspended for a short period of time, procedures for acquiring an ID numbers from each secondary side and for performing authentication are not carried out again, so time taken in multiple power transmission is shortened.

According to an embodiment of the present disclosure, a power receiving unit includes a communication unit, a control unit, a detecting unit that performs metallic foreign matter detection, and a charge storage unit; when the control unit receives a Q-value measurement command from the power transmitting device through the communication unit, the control unit at least controls charging by which electric power consumed by the detecting unit during Q-value measurement is stored in the charge storage unit.

For example, in the above structure, upon receipt of a Q-value measurement command from the power transmitting device, if identification information included in the Q-value measurement command matches identification information assigned to the power receiving device, the control unit stores the above electric power in the charge storage unit and then has the detecting unit measure the Q value. If the identification information included in the Q-value measurement command does not match the identification information assigned to the power receiving device, the control unit only stores the above electric power in the charge storage unit.

For example, in the above structure, upon receipt of a Q-value measurement command from the power transmitting device, the control unit stores the above electric power in the charge storage unit, after which the control unit performs control so as to have the detecting unit measure the Q value.

According to an embodiment of the present disclosure, charge storage units in all of a plurality of power receiving devices are charged and their power supplies are assured. Accordingly, even if power transmission from a primary side is suspended for a short period of time, the power supplies of the power receiving devices are not turned off.

According to the present disclosure, when one primary side charges a plurality of secondary sides, even if power transmission from the primary side is suspended for a short period of time, the power supplies on all the secondary sides are assured, eliminating a burden to acquire identification information from each secondary side again and perform authentication again and thereby shortening processing time.

DETAILED DESCRIPTION OF EMBODIMENTS

Figure 1:
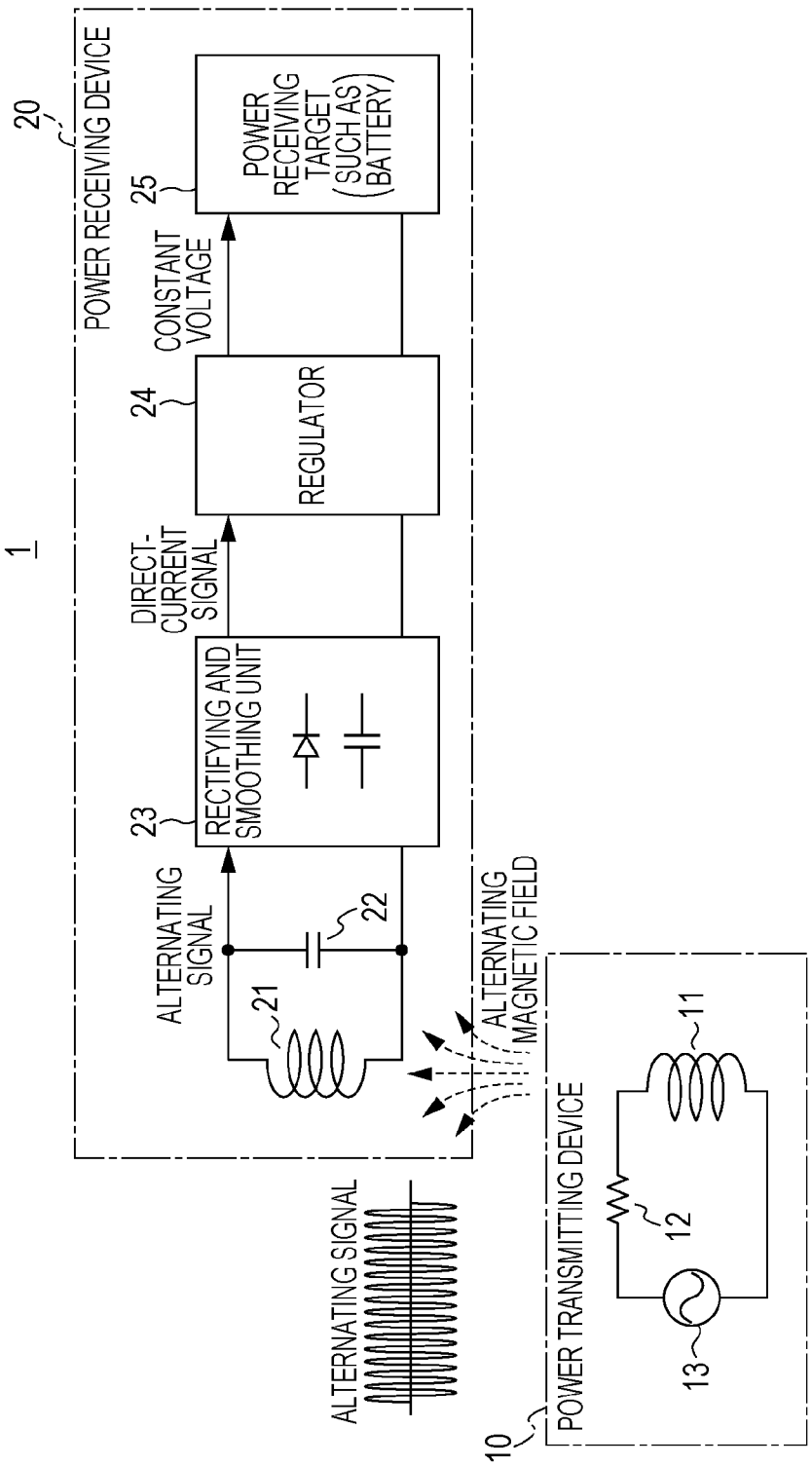
FIG. 1 is a block diagram that outlines a wireless power transfer system.

Embodiments of the present disclosure will be described with reference to the drawings. In the description below and the drawings, constituent elements having substantially the same function or structure are indicated by the same reference numeral to eliminate duplicate descriptions.

Descriptions will be given in the following order.
1. Explanation of installation
2. First embodiment (Q-value measurement circuit: example in which both charge storage in a capacitor and Q value measurement are carried out when an ID matches, and only charge storage in the capacitor is carried when an ID does not match)

3. Second embodiment (Q-value measurement circuit: example in which charge storage in a capacitor and Q value measurement are first carried out in all power receiving devices)

4. Others (various variations)

1. Explanation of Installation

In an example of the present disclosure, a technology that decides whether there is metallic foreign matter by measuring the Q value of a circuit including a coil electromagnetically coupled to the outside is applied to a case in which one primary side (power transmitting device) charges a plurality of secondary sides (power receiving devices).

The Q value is an index representing a relationship between energy conservation and energy loss; it is usually used as a value that represents the sharpness of a resonance peak (strength of resonance) in a resonance circuit.

Metallic foreign matter includes a conductor, such a metal, present between the power transmitting side and the power receiving side and an unintended circuit including a coil. Conductors in the meaning in this description include conductors in a broad sense, that is, semiconductors. In the description below, detecting a circuit including a conductor such as a metal and a coil will be also referred to below as detecting a conductor and the like.

Principle of Q-Value Measurement

The principle of Q-value measurement will be described with reference to the drawings.

Figure 5:
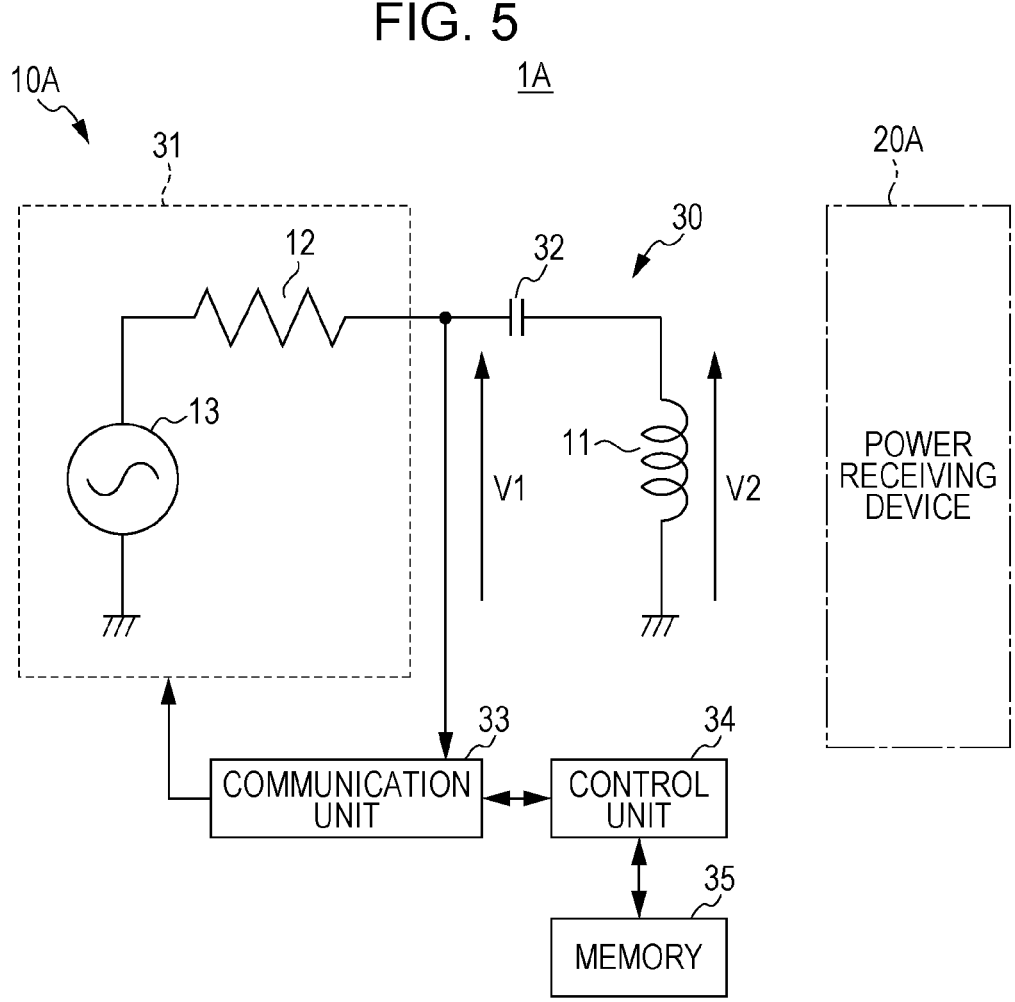
FIG. 5 illustrates metallic foreign matter detection through Q-value measurement in which a resonance circuit is used.

FIG. 5 is a schematic circuit diagram, which is used to explain Q-value measurement carried out in a wireless power transfer system.

This wireless power transfer system 1A includes a power transmitting device 10A and a power receiving device 20A. For convenience of explanation, in the example in FIG. 5, a Q-value measurement circuit (an example of a detecting unit) is applied to the power transmitting device 10A in the wireless power transfer system 1A.

The circuit in the power transmitting device 10 illustrated in FIG. 5 is an example of the most basic circuit structure (in the case in which magnetic field coupling is used) that represents the principle of Q-value measurement. Although the circuit includes a series resonance circuit, if the circuit has a function of a resonance circuit, various forms of its detailed structure can be considered. Q-value measurement by the use of this resonance circuit is also being applied to LCR meters (inductance (L), capacitance (C), and resistance (R)).

If a meal piece, an example of metallic foreign matter, is present in the vicinity of a power transmitting coil 11 in the power transmitting device 10A, magnetic lines of force pass through the metal piece and an eddy current flows in the metal piece. When viewed from the power transmitting coil 11, this appears to be that the metal piece and power transmitting coil 11 have been electromagnetically coupled together and an actual resistive load has applied to the power transmitting coil 11, changing the Q value on the primary side. When this Q value is measured, the presence of the metallic foreign matter in the vicinity of the power transmitting coil 11 (in an electromagnetically coupled state) can be detected.

The power transmitting device 10A includes a signal source 31, a capacitor 32, and the power transmitting coil 11 (that is an example); the signal source 31 includes a resistive element 12 and an alternating power supply 13 that generates an alternating signal (sine wave). The resistive element 12 is a visualized form of the internal resistance (output impedance) of the alternating power supply 13. The capacitor 32 and power transmitting coil 11 are interconnected so as to form a series resonance circuit (an example of a resonance circuit) with respect to the signal source 31. The value (C value) of the capacitance of the capacitor 32 and the value (L value) of the inductance of the power transmitting coil 11 have been adjusted so that resonance occurs at a frequency at which to measure the Q value.

A power transmitting part 30, including the signal source 31 and capacitor 32, modulates a carrier wave by a load modulation method or the like under control of a communication unit 33 and a control unit 34 and transfers electric power by wireless through the power transmitting coil 11 to the outside.

Figure 2:
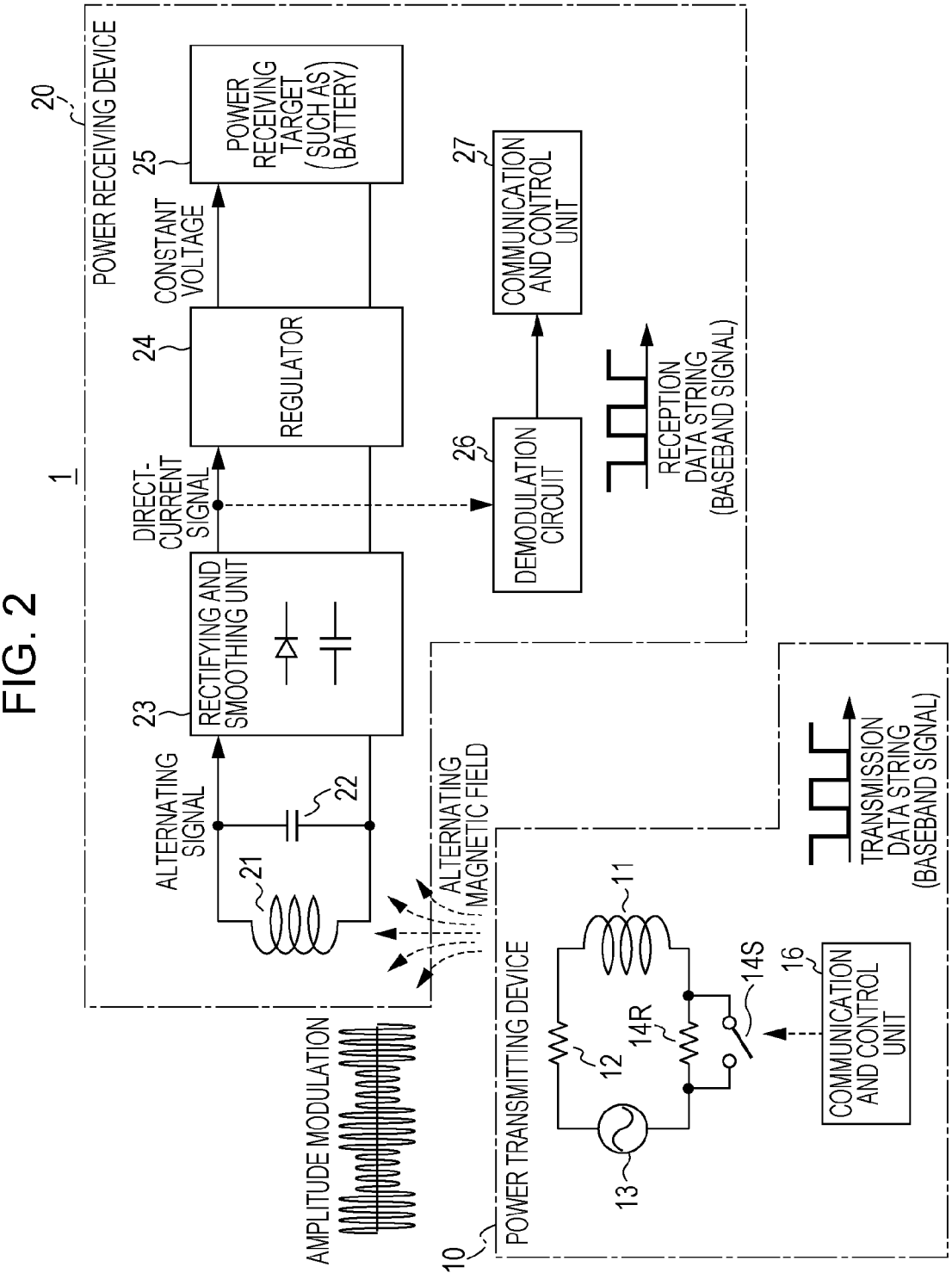
FIG. 2 is a block diagram illustrating an example of a structure by which, in the wireless power transfer system, data is transmitted from a power transmitting device to a power receiving device.
Figure 3:
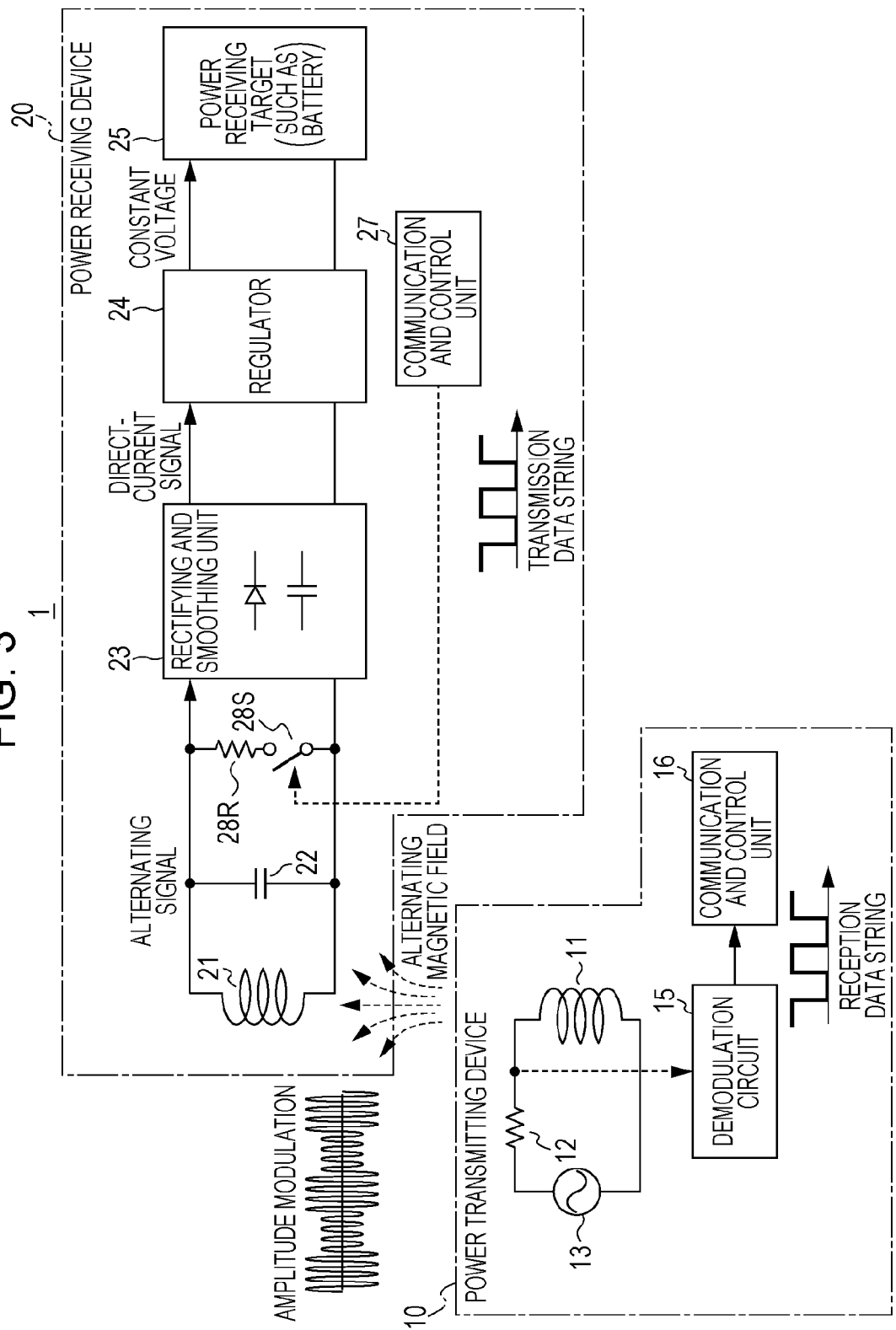
FIG. 3 is a block diagram illustrating an example of a structure by which, in the wireless power transfer system, data is transmitted from the power receiving device to the power transmitting device.
Figure 4:
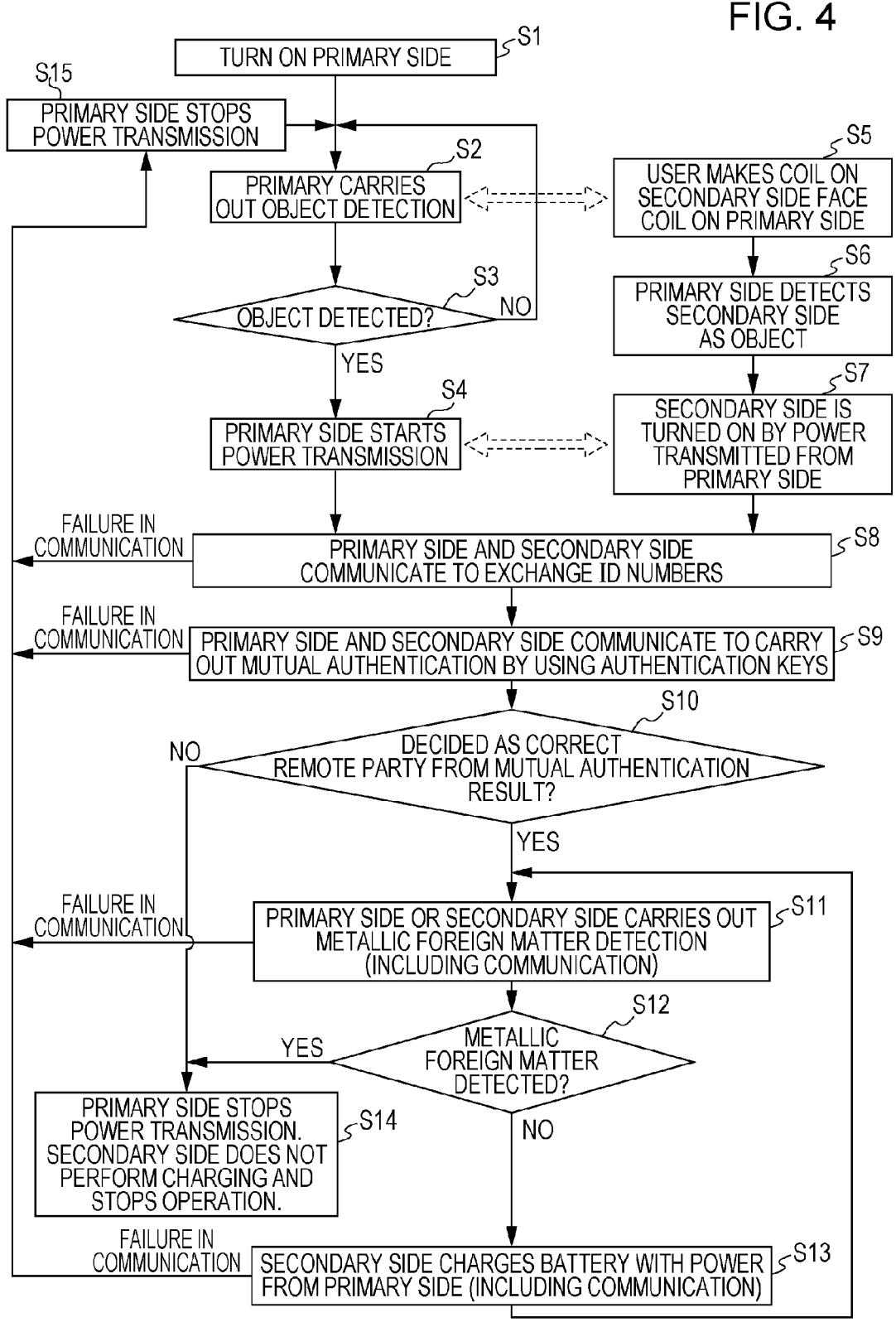
FIG. 4 is a flowchart illustrating the operation of a wireless power transfer system in related art.

The communication unit 33 has, as an example, a transmission function implemented by a resistive element 14R, a switch 14S, and a communication and control unit 16 illustrated in FIG. 2 and also has a reception function implemented by a modulation circuit 15 and the communication and control unit 16 illustrated in FIG. 3.

The control unit 34 corresponds to the communication and control unit 16 in FIGS. 2 and 3.

A memory 35 stores a threshold of the Q value according to which the presence of metallic foreign matter is decided, the ID number of the power transmitting device 10A, and an ID number acquired from the power receiving device 20A, for example.

If the voltage across the power transmitting coil 11 and capacitor 32, which form the series resonance circuit, is denoted by V1 and the voltage across the power transmitting coil 11 is denoted by V2 (these voltages are examples of voltages applied to the resonance circuit), the Q value of the series resonance circuit is represented by equation (1).

$$Q = \frac{V2}{V1} = \frac{2\pi fL}{r_s} \quad (1)$$

$r_s$: effective resistance at frequency $f$

The voltage V1 is increased to Q times and voltage V2 is obtained. As the metallic foreign matter comes closer to the power transmitting coil 11, the effective resistance $r_s$ becomes larger and the Q value is reduced. Thus, when the metallic foreign matter comes close to the power transmitting coil 11, the Q value (electromagnetically coupled state) changes so as to decrease in many cases. If this change is detected, a metal piece in the vicinity of the power transmitting coil 11 can be detected.

Figure 6A:
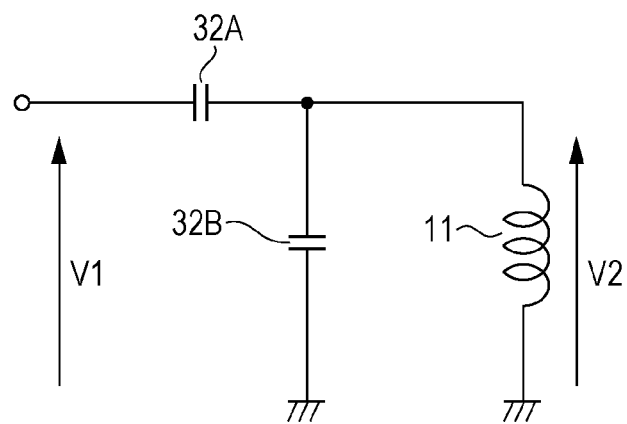
FIGS. 6A and 6B are circuit diagrams illustrating other exemplary resonance circuits.
Figure 6B:
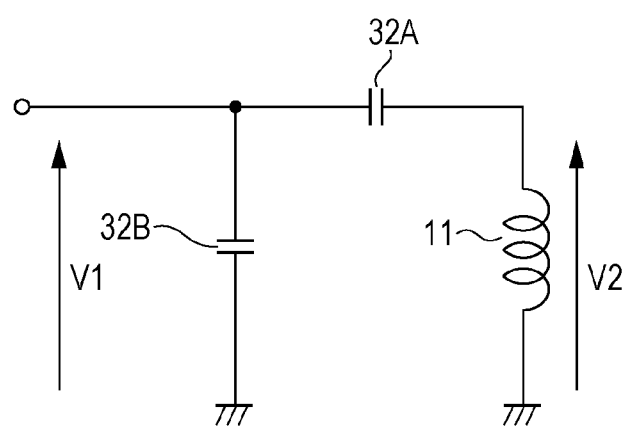

Although a series resonance circuit has been used in the example to explain Q-value measurement, another resonance circuit may be used instead of the series resonance circuit, as illustrated in FIGS. 6A and 6B.

In the example in FIG. 6A, to form a resonance circuit, a capacitor 32A is connected in series with a parallel resonance circuit formed with a capacitor 32B and the power transmitting coil 11. In the example in FIG. 6B, to form a resonance circuit, the capacitor 32B is connected in parallel to a series resonance circuit formed with the capacitor 32A and the power transmitting coil 11.

Voltage V1 across the power transmitting coil 11 and capacitor 32A and voltage V2 across the power transmitting coil 11, which are obtained from the resonance circuit illustrated in FIGS. 6A and 6B, are used to calculate the Q value. The calculated Q value is compared with a threshold prestored in the memory 35 to decide whether there is metallic foreign matter.

The series resonance circuit and other resonance circuits described above have been only exemplified to explain the principle of the method of detecting an electromagnetically coupled state, so the structure of the resonance circuit is not limited to these examples.

Exemplary Structure of the Power Receiving Device

Next, an example in which the Q-value measurement circuit is applied to the power receiving device will be described.

Figure 7:
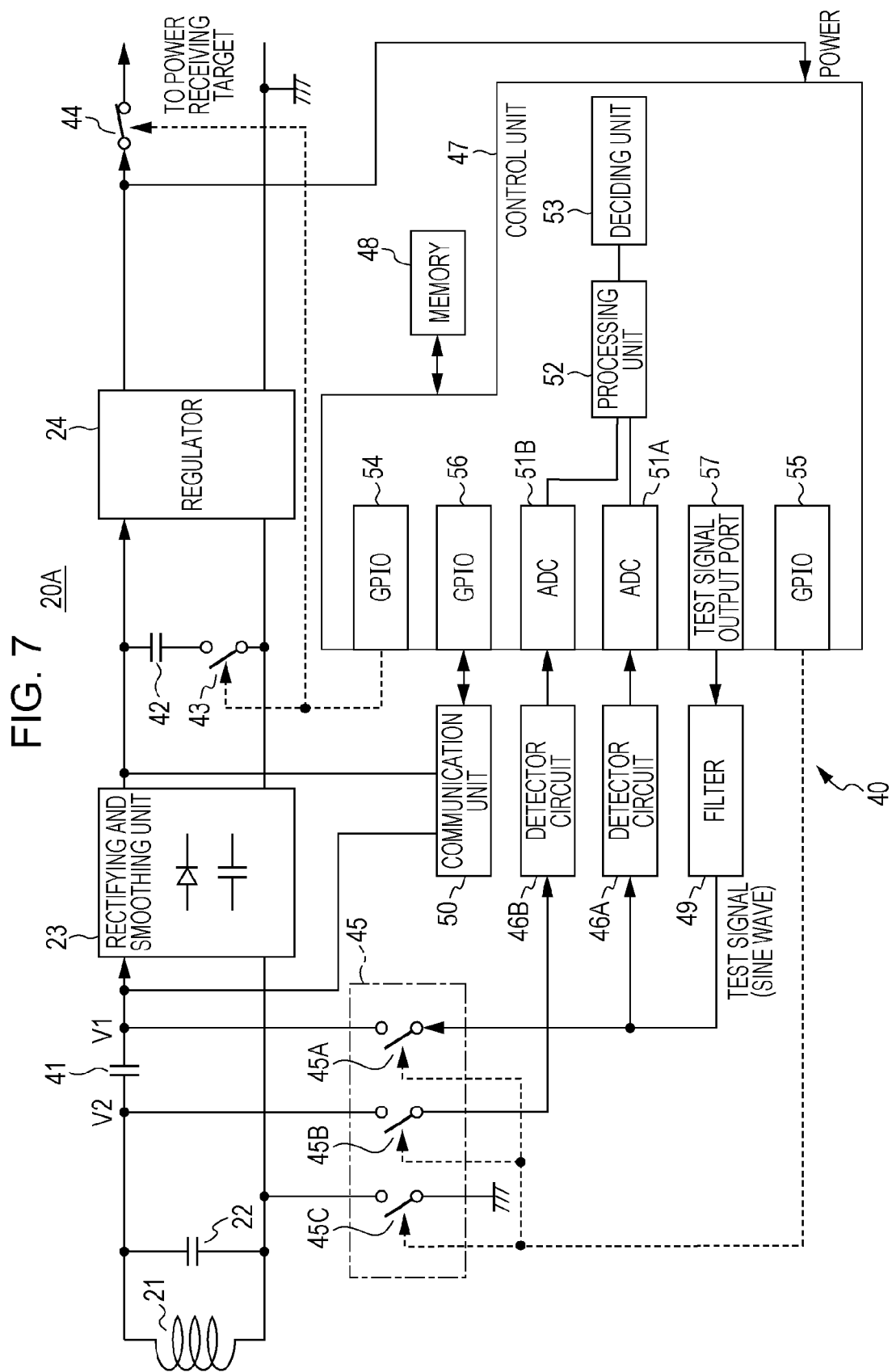
FIG. 7 is a block diagram illustrating an example of the structure of a Q-value measurement circuit provided in the power receiving device in a wireless power transfer system in the present disclosure.

FIG. 7 is a block diagram illustrating an example of the internal structure of the power receiving device 20A used in the wireless power transfer system. The power receiving device 20A in FIG. 7 is a specific example of the structure of a Q-value measurement circuit 40 (an example of a detecting unit). The power receiving device 20A is structured so that a circuit used for power transmission and a circuit used for Q-value measurement are selectively switched by a switchover.

The power receiving device 20A has a rectifying and smoothing unit 23 and a resonance circuit formed with a power receiving coil 21 and capacitors 22 and 41; the power receiving device 20A is structures so that electric power is supplied to the power receiving target through a regulator 24.

In the power receiving device 20A, an end of a parallel circuit of the power receiving coil 21 and capacitor 22 is connected to an input terminal of the rectifying and smoothing unit 23 through the capacitor 41 and another end of the parallel circuit is connected to another input terminal of the rectifying and smoothing unit 23.

A capacitor 42 and a first switch 43 are connected in series behind the rectifying and smoothing unit 23. An end of the capacitor 42 is connected to an output terminal of the rectifying and smoothing unit 23 and an end of the first switch 43 is connected to another output terminal of the rectifying and smoothing unit 23. The output terminal, to which the capacitor 42 is connected, of the rectifying and smoothing unit 23 is connected to an input terminal of the regulator 24, and an output terminal of the regulator 24 is connected to the power receiving target through a second switch 44. The other terminal, to which the first switch 43 is connected, of the rectifying and smoothing unit 23 is connected to a ground terminal.

The regulator 24 controls voltage and current to be output so that they are kept at fixed levels. For example, the regulator 24 supplies constant-voltage signals (power supplies) to the power receiving target and constituent components including the control unit 47. Another regulator may be separately provided so that different constant voltage signals are supplied to the power receiving target and the constituent components.

The power receiving device 20A further includes third switches 45, detector circuits 46A and 46B, a control unit 47, a memory 48, a filter 49, and a communication unit 50 that communicates with the power transmitting device 10.

The detector circuit 46A demodulates an envelope of an alternating signal (corresponding to voltage V1) entered from an end of the capacitor 41 through a third switch 45A and supplies a demodulated signal to an analog-digital (AD) conversion (ADC) port 51A of the control unit 47. Similarly, the detector circuit 46B modulates an envelope of an alternating signal (corresponding to voltage V2) entered from another end of the capacitor 41 through a third switch 45B and supplies a demodulated signal to an ADC port 51B of the control unit 47.

The filter 49 shapes a test signal output from a test signal output port 57 in the control unit 47 into a sine wave, and supplies the sine wave to the resonance circuit, that is, to the end of the capacitor 41 on the same side as the rectifying and smoothing unit 23 through the third switch 45A.

The other end of a parallel circuit of the power receiving coil 21 and capacitor 22 is connected to a ground terminal through a third switch 45C.

The communication unit 50, which is an example of an interface, carries out communication with the communication unit 33 of the power transmitting device 10A. For example, the communication unit 50 transmits and receives information involved in detection of metallic foreign matter such as the Q value of the resonance circuit including the power receiving coil 21 in the power receiving device 20A and a decision result as to whether there is metallic foreign matter. The communication unit 50 demodulates a direct-current signal resulting from rectification and smoothing by the rectifying and smoothing unit 23, extracts reception data string (baseband signal), and supplies the extracted reception data string to a general-purpose input/output (GPIO) port 56 in the control unit 47. The communication unit 50 also performs load modulation according to the transmission data string (baseband signal) output from the GPIO port 56 in the control unit 47 and supplies the resulting signal to the power receiving coil 21.

The communication unit 50 has, as an example, a reception function implemented by a demodulation circuit 26 and a communication and control unit 27 illustrated in FIG. 2 and a transmission function implemented by a resistive element 28R, a switch 28S, and a communication and control unit 27 illustrated in FIG. 3.

Transistors, metal-oxide-semiconductor field-effect transistors (MOSFETs), and other switching elements are used to implement the first switch 43 (an example of a first switching unit), second switch 44 (an example of a second switching unit), and third switches 45A to 45C (examples of third switching units).

The control unit 47, which is an example of a controller and is implemented by, for example, a microcomputer, controls the entire power receiving device 20A. As an example, the control unit 47 includes the ADC ports 51A and 51B, a processing unit 52, a deciding unit 53, GPIO ports 54 to 56, and the test signal output port 57.

The GPIO ports are used for general-purpose inputs and outputs. To turn on and off the switches 43, 44, and 45A to 45C (MOSFET gate terminals, for example), the control unit 47 uses electric power supplied from the regulator 24 to supply driving signals from the GPIOs 54 and 55 to these switches. The ADC port 51A converts an analog demodulated signal received from the detector circuit 46A and outputs the converted signal to the processing unit 52. Similarly, the ADC port 51B converts an analog demodulated signal received from the detector circuit 46B and outputs the converted signal to the processing unit 52.

The processing unit 52 calculates a ratio between voltages V1 and V2, that is, the Q value of the resonance circuit, from the demodulated signals received from the ADC ports 51A and 51B, and outputs the calculated Q value to the deciding unit 53. In the metallic foreign matter detection through Q-value measurement, frequency sweep processing may be carried out to identify the frequency at which the Q value becomes largest.

The deciding unit 53 compares the Q value received from the processing unit 52 with a threshold prestored in the nonvolatile memory 48 and decides whether there is metallic foreign matter in the vicinity according to the comparison result. The metallic foreign matter decision result is sent from the GPIO port 56 to the communication unit 50 and then transmitted from the power receiving coil 21 to the power transmitting device 10A under control of the communication unit 50.

In Q-value measurement, the test signal output port 57 generates a test signal and supplies the generated test signal to the filter 49 under control of the control unit 47.

The memory 48 stores a threshold of the Q value on the secondary side for each frequency, the threshold having been measured in advance in a state in which there is nothing in the vicinity of the power receiving coil 21 or nothing is placed on the power receiving coil 21. The memory 48 also stores an ID number (identification information) assigned to each power receiving device and an ID number acquired from the power transmitting device.

In Q-value measurement in the wireless power transfer system 1A structured as described above, power transmission from the power transmitting device 10A is suspended for a short period of time, during which the control unit 47 in the power receiving device 20A outputs a test signal (sine wave) to measure the Q value of the peripheral circuit of the power receiving coil 21 in the power receiving device 20A.

If power transmission from the power transmitting device 10A is not suspended, signals with large electric power would be input from the power transmitting device 10A to the test signal output port 57 and ADC ports 51A and 51B in the power receiving device 20A. To prevent this, it is desirable to suspend power transmission from the power transmitting device 10A.

The capacitor 42 in the power receiving device 20A is charged before power transmission from the power transmitting device 10A is temporarily suspended so that the Q-value measurement circuit 40 is operated with electric power stored in the capacitor 42 to start Q-value measurement. When the capacitor 42 is charged, it is enabled by closing (turning on) the first switch 43 under control of the control unit 47.

After the capacitor 42 has been charged for a fixed time, a test signal is output from the test signal output port 57 in the power receiving device 20A. Then, to measure voltages V1 and V2 at both ends of the capacitor 41, the third switches 45 are closed (turned on) under control of the control unit 47. The value of voltage V1 supplied to the ADC port 51A and the value of the voltage V2 supplied to the ADC port 51B are read, and the Q value is calculated from equation (1). A battery or the like (power receiving target 25) to which to supply electric power (to be charged) is separated from the Q-value measurement circuit 40 by turning off the second switch 44 under control of the control unit 47 before the Q value is measured.

Operations in Q-Value Measurement

Figure 8:
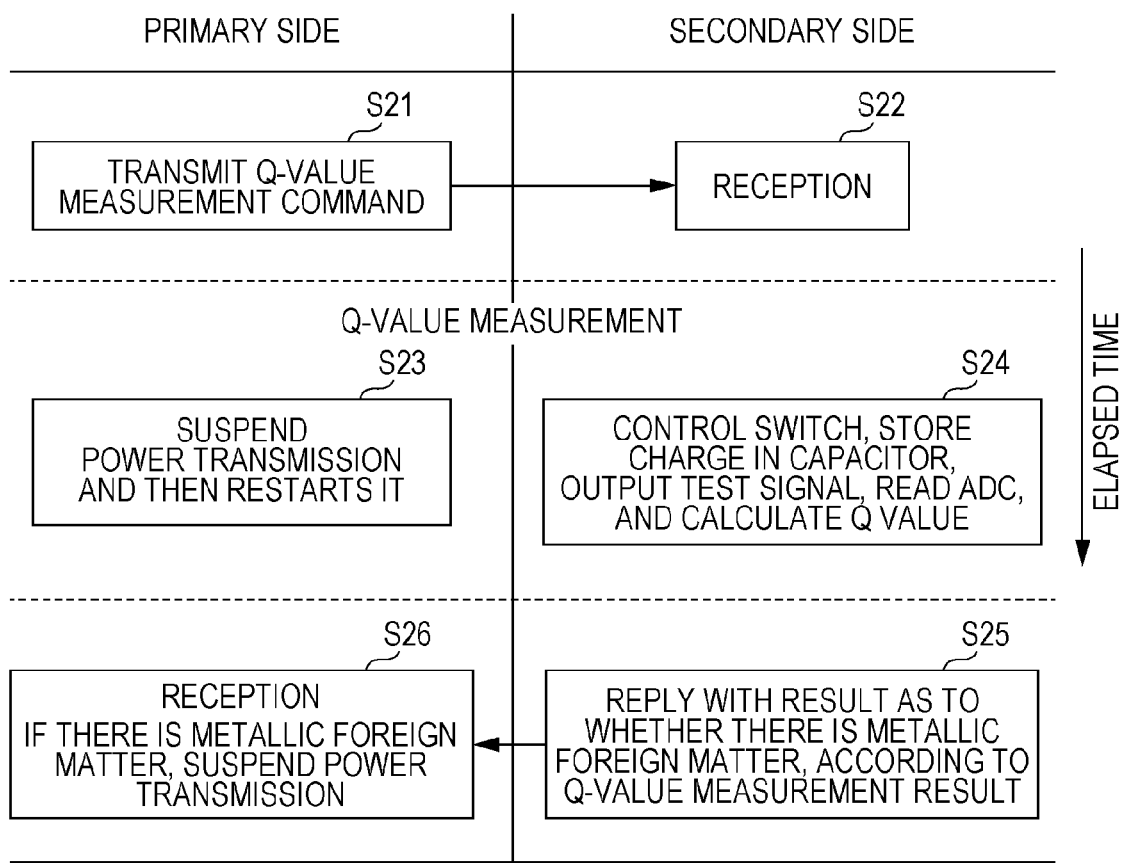
FIG. 8 is a sequence diagram illustrating an example of communication based on a Q-value measurement command.
Figure 9:
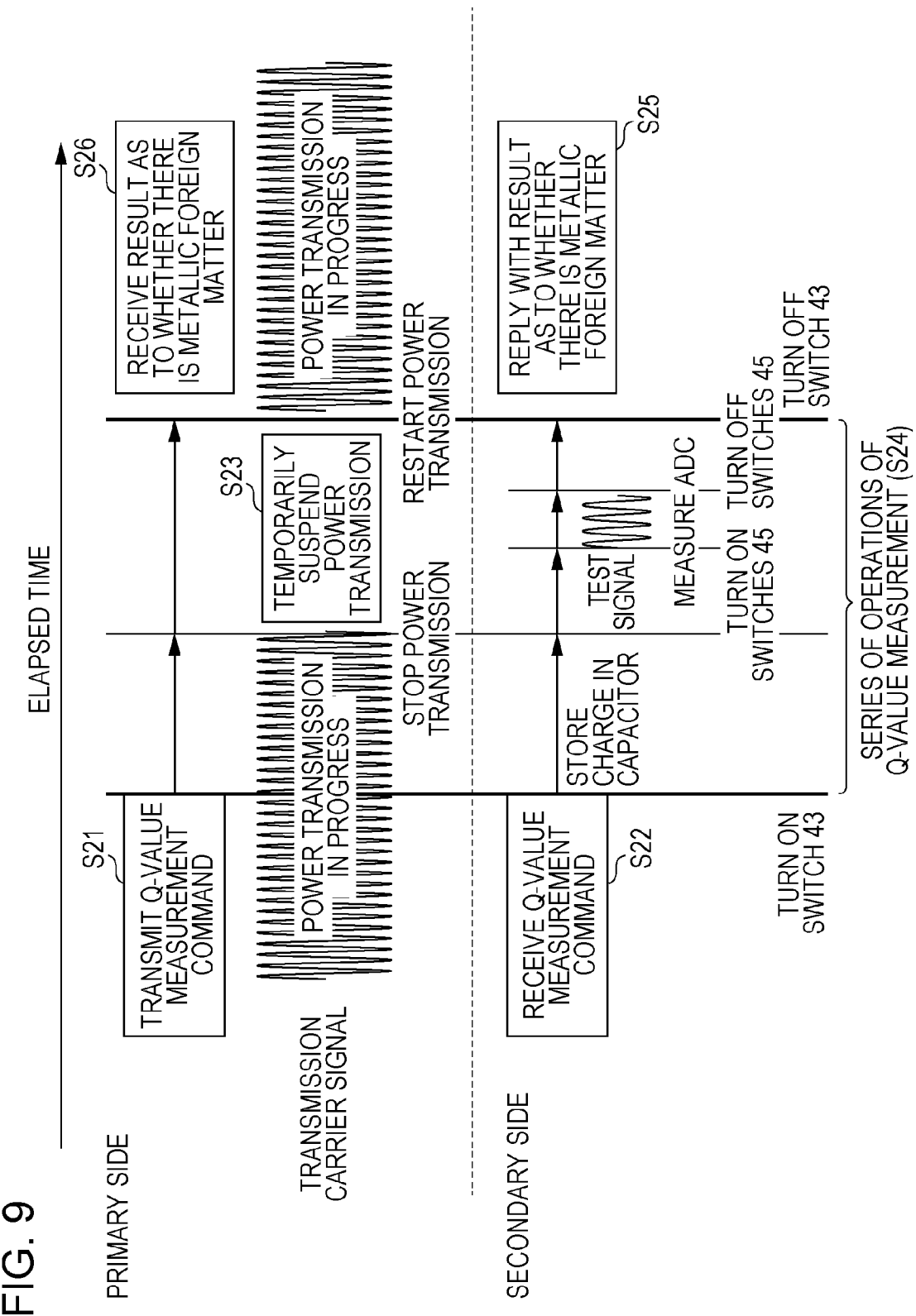
FIG. 9 is a timing diagram in Q-value measurement.

In the wireless power transfer system 1A, the power transmitting device 10A (primary side) and power receiving device 20A (secondary side) communicate with each other to measure the Q value. Operations in Q-value measurement will be described with reference to the sequence diagram in FIG. 8 that illustrates an example of communication based on a Q-value measurement command and the timing diagram in Q-value measurement in FIG. 9.

First, a Q-value measurement command is transmitted from the power transmitting device 10A to the power receiving device 20A (step S21). When the power receiving device 20A receives the command (step S22), the power transmitting device 10A and power receiving device 20A synchronously operate to measure the Q value.

After having transmitted the Q-value measurement command, the power transmitting device 10A temporarily suspends power transmission and restarts it after the elapse of a fixed time (step S23). The fixed time may be a time during which more electric power than consumed by the Q-value measurement circuit 40 in one Q-value measurement can be stored. If a current draw in the Q-value measurement circuit 40 is small to a certain extent and a time taken in Q-value measurement is short, it is possible to measure the Q value while the carrier signal from the power transmitting device 10A is suspended.

The power receiving device 20A turns on the first switch 43 and stores charge in the capacitor 42 during a time interval from when the power receiving device 20A has received the Q-value measurement command until the power transmitting device 10A temporarily suspends power transmission after the elapse of a fixed time. After having stored charge in the capacitor 42, the power receiving device 20A turns on the third switches 45 (45A to 45C), turns off the second switch 44, and supplies a test signal at a resonance frequency to the circuit including the power receiving coil 21. The power receiving device 20A then reads the values of voltages V1 and V2 obtained at the ADC ports 51A and 51B and calculates the Q value (step S24). Upon completion of the Q-value calculation, the power receiving device 20A turns off the third switches 45 (45A to 45C) and turns on the second switch 44.

As described above, during Q-value measurement, a sequence of operations of charge storage in the capacitor 42 by the power receiving device 20A, temporary power transmission suspension by the power transmitting device 10A, test signal output and voltage measurement by the power receiving device 20A, and power transmission restart by the power transmitting device 10A is carried out.

The power receiving device 20A compares the measured Q value with the threshold to decide whether there is metallic foreign matter and replies to the power transmitting device 10A with the decision result (step S25). The power transmitting device 10A receives the decision result from the power receiving device 20A (step S26). If the decision result indicates that there is metallic foreign matter, the power transmitting device 10A suspends power transmission. If there is no metallic foreign matter, the power transmitting device 10A continues power transmission and the power receiving device 20A supplies electric power to the capacitor 42 (charges a battery, for example).

The power receiving device 20A in this example charges the capacitor 42 each time it measures the Q value and uses the electric power stored in the capacitor 42 to drive the detecting unit (Q-value measurement circuit). When electric power is not supplied from the primary side to the secondary side, therefore, the Q value can be measured without using the battery on the secondary side. This enables non-use of a large battery intended to detect metallic foreign matter and a complex circuit configured to control its electric power on the secondary side. Therefore, it can be expected to make mobile terminals and the like compact and lightweight and reduce costs.

When the first to third switches in the power receiving device are appropriately switched depending on whether power is supplied or the Q value is measured, it is possible to prevent interference between the power transmission signal output from the primary side and the test signal (sine wave) output from the test signal output port 57 on the secondary side, the test signal being used in Q-value measurement, enabling highly precise calculation of the Q value.

Since the power receiving device is applied to a wide range including various types of mobile devices, it desirable for the power receiving device to have a specific threshold of the Q value in memory.

Study of Multiple Power Transmission

First Consideration

The basic operations in power transmission and Q-value measurement described above are applied to the so-called one-to-one power transmission, in which power is transmitted from one power transmitting device (primary side) to one power receiving device (secondary side).

When so-called multiple power transmission, in which one primary side charges a plurality of secondary sides, is carried out, the primary side first uses a polling command to acquire the ID number from each secondary side. The primary side then transmits authentication, control, and charging commands with an ID number specified to carry out one-to-one communication with the secondary side. Thus, the primary side can carry out authentication, control, and charging for a particular one of the plurality of secondary sides.

Figure 10:
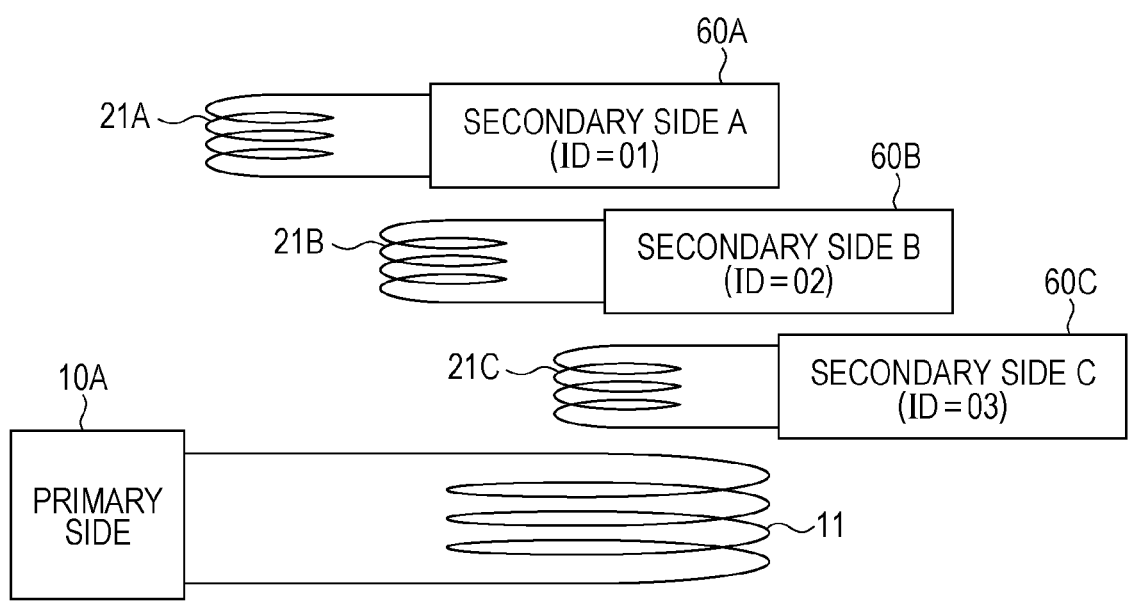
FIG. 10 is a schematic diagram of a wireless power transfer system that transmits electric power to a plurality of power receiving devices.

Multiple power transmission will be described below, assuming that, for example, one primary side (power transmitting device 10A) transmits power to three secondary sides (power receiving devices 60A, 60B, and 60C) as shown in FIG. 10.

The power receiving devices 60A to 60C are each equivalent to the power receiving device 20A. In the description below, the power receiving device 60A, power receiving device 60B, and power receiving device 60C will be respectively referred to below as secondary side A (ID=01), secondary side B (ID=02), and secondary side C (ID=03).

Figure 11:
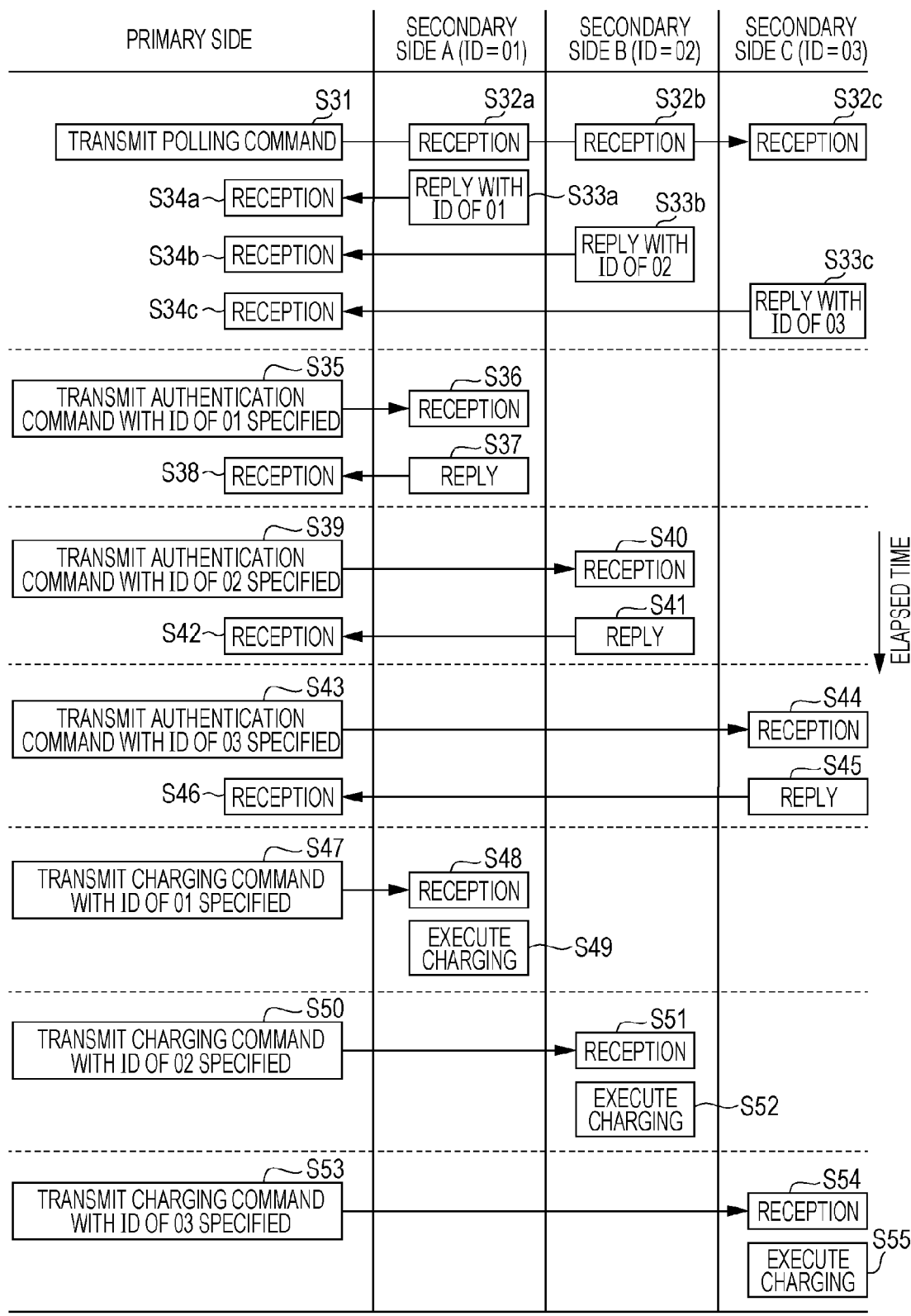
FIG. 11 is a sequence diagram illustrating a communication example in multiple power transmission in related art.

FIG. 11 is a sequence diagram illustrating a communication example in multiple power transmission in related art.

First, the control unit 34 on the primary side transmits a polling command through the communication unit 33 (step S31), and control units 47 in secondary sides A to C receive the polling command (steps S32a, S32b, and S32c). The secondary sides A to C reply to the primary side with their ID numbers (steps S33a, S33b, and S33c), and the primary side receives these ID numbers of the secondary sides (steps S34a, S34b, and S34c).

The control unit 34 on the primary side recognizes secondary sides A to C present near the primary side and transmits an authentication command with an ID number of 01 specified (step S35). The control unit 47 on secondary side A specified with its ID number receives this authentication command through the communication unit 50 (step S36), and returns a reply to the primary side (step S37). The primary side receives this reply from secondary side A (step S38). The primary side and secondary side A are mutually authenticated through this communication.

Next, the primary side transmits an authentication command with an ID number of 02 specified and the primary side and specified secondary side B are mutually authenticated (steps S39 to S42).

The primary side further transmits an authentication command with an ID number of 03 specified and the primary side and specified secondary side C are mutually authenticated (steps S43 to S46).

Upon completion of mutual authentication of secondary sides A to C present near the primary side, the primary side transmits a charging command with an ID number of 01 specified (step S47). Secondary side A specified with its ID number receives this charging command (step S48) and executes charging as commanded (step S49).

The primary side then transmits a charging command with an ID number of 02 specified (step S50) and specified secondary side B executes charging (steps S51 and 52).

The primary side further transmits a charging command with an ID number of 03 specified (step S53) and specified secondary side C executes charging (steps S54 and 55).

As described above, the primary side separately transmits commands to the secondary sides to be specified by changing ID numbers successively, starting from 01, followed by 02 and 03, to command control operation individually.

If, for example, the user carries away the secondary side after authentication between the primary side and the secondary side the secondary side fails to receive electric power and the power supply of the control unit on the secondary side is turned off. After that, even if the power supply of the secondary side is turned on again, ID number exchanging and authentication become necessary again. That is, once the power supply of the secondary side is turned off, a restart from the initial state becomes necessary.

When communication between the primary side and the secondary side is discontinued, the primary side suspends power transmission and turns off the power supplies of all the secondary sides, after which the primary side restarts power transmission and carries out acquisition of the ID numbers of all the secondary sides and authentication again.

Second Consideration

Figure 12:
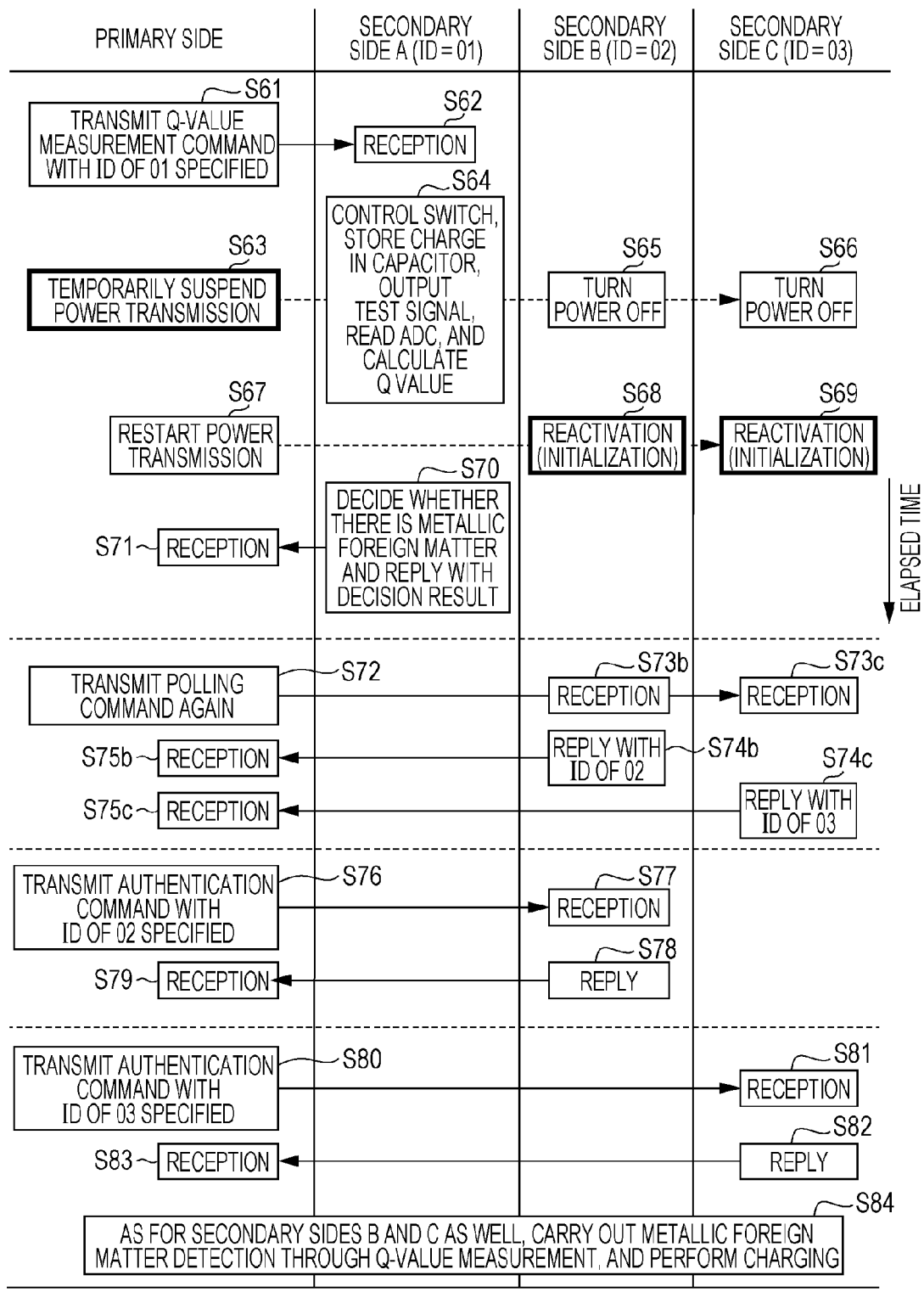
FIG. 12 is a sequence diagram illustrating a Q-value measurement example during power transmission to a plurality of power receiving devices.

When the secondary side (power receiving device 20A in FIG. 7) carries out Q-value measurement operation in multiple power transmission, a problem as described below arises. This problem will be described with reference to the sequence diagram in FIG. 12. In processing in the description below, mutual authentication between the primary side and secondary sides A to C is assumed to have been completed once.

First, the control unit 34 on the primary side transmits a Q-value measurement command with an ID number of 01 specified through the communication unit 33 (step S61). The control unit 47 on secondary side A specified with its ID number receives this Q-value measurement command (step S62).

After having transmitting the Q-value measurement command, the control unit 34 on the primary side temporarily suspends power transmission (step S63).

Before the primary side suspends power transmission, the control unit 47 on secondary side A turns on the first switch 43 to store charge in the capacitor 42, after which the control unit 47 turns on the third switches 45 (45A to 45C), turns off the second switch 44, and supplies a test signal at a prescribed frequency to the circuit including the power receiving coil 21. The control unit 47 then reads the values of voltages V1 and V2 obtained at the ADC ports 51A and 51B and calculates the Q value (step S64). Upon completion of the Q value calculation, the control unit 47 turns off the third switches 45 (45A to 45C) and turns on the second switch 44.

In this case, charge is not stored in the capacitors 42 on secondary sides B and C because their ID numbers are not specified. When the primary side temporarily suspends power transmission, therefore, the power supplies of secondary sides B and C are turned off (steps S65 and S66).

When the primary side restarts power transmission after the elapse of a fixed time (step S67), since secondary sides B and C have been turned off, they are activated again, that is, activated from their initial states (steps S68 and S69).

The control unit 47 on secondary side A specified with its ID number compares the measured Q value with the threshold to decide whether there is metallic foreign matter and replies to the power transmitting device 10A with the decision result (step S70). The control unit 34 on the primary side receives the decision result (step S71).

The primary side then transmits a polling command again (step S72). The control units on reactivated secondary sides B and C receive the polling command (steps S73b and S73c). The control units 47 on secondary sides B and C reply to the primary side with their ID numbers (steps S74b and S74c), and the primary side receives the ID numbers of the secondary sides B and C (steps S75b and S75c).

The control unit 34 on the primary side confirms secondary sides B and C present near it again, and transmits an authentication command with an ID number of 02 specified (step S76). The control unit 47 on secondary side B specified with its ID number receives this authentication command through the communication unit 50 (step S77), and returns a reply to the primary side (step S78). The primary side receives this reply from secondary side B (step S79). The primary side and secondary side are mutually authenticated through this communication.

Next, the primary side transmits an authentication command with an ID number of 03 specified and the primary side and specified secondary side C are mutually authenticated (steps S80 to S83).

As for secondary sides B and C as well, metallic foreign matter detection is then carried out through Q-value measurement, and charging is performed (step S84).

As described above, when a secondary side specified with its ID number so as to carry out Q-value measurement operation, the secondary side stores charge in a Q-value measurement capacitor before the primary side suspends power transmission, so the power supply is assured on the secondary side. Since the power supplies of all the other secondary sides are turned off, however, even if they are turned on again, the secondary sides are activated from their initial states, so ID number exchanging and authentication are performed again. Each time Q-value measurement is repeated in the control flow, ID number exchanging and authentication are executed, so time taken for other than charging is prolonged and it takes time until the capacitor is fully charged.

2. First Embodiment

To clear the above problem in a multiple power transmission system, when one secondary side measures the Q value, all the other secondary sides also store charge in their capacitors and perform an operation to assure their power supplies.

Figure 13:
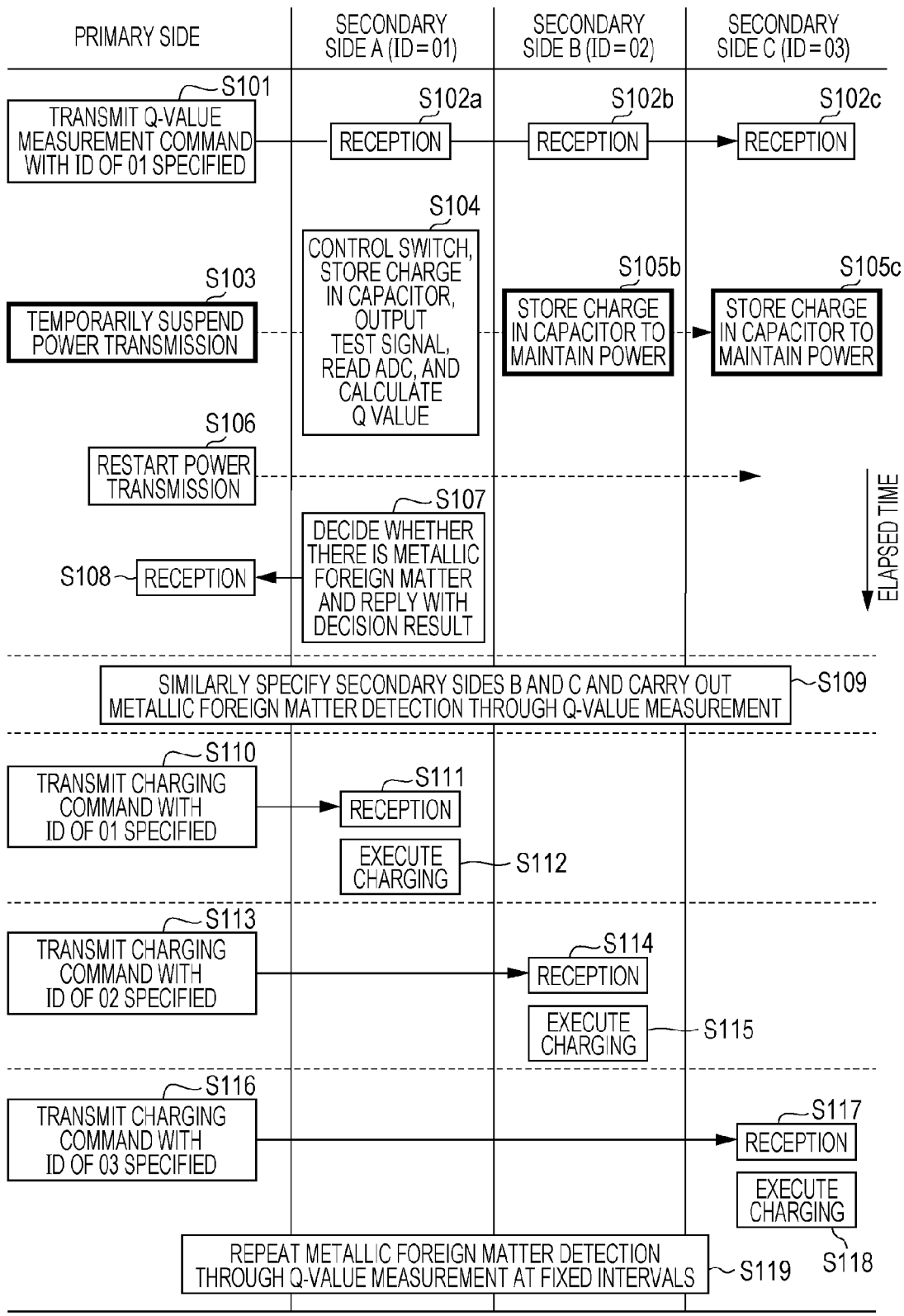
FIG. 13 is a sequence diagram illustrating a Q-value measurement example during multiple power transmission in a first embodiment of the present disclosure.

FIG. 13 is a sequence diagram illustrating a Q-value measurement example during multiple power transmission in a first embodiment of the present disclosure. In the description below, it is assumed that mutual authentication between the primary side and secondary sides A to C has been completed.

Upon completion of mutual authentication between the primary side and secondary sides A to C, the control unit 34 on the secondary side first transmits a Q-value measurement command with an ID number of 01 specified through the communication unit 33 (step S101). The control units 47 in secondary sides A to C receive this Q-value measurement command (steps S102a, S102b, and S102c).

After transmitting the Q-value measurement command, the control unit 34 on the primary side temporarily suspends power transmission (step S103).

The control unit 47 on the secondary side A specified with its ID number finds that the ID number included in the Q-value measurement command matches the ID number assigned to the power receiving device. Before the primary side suspends power transmission, the control unit 47 on secondary side A turns on the first switch 43 to store charge in the capacitor 42, after which the control unit 47 turns on the third switches 45 (45A to 45C), turns off the second switch 44, and supplies a test signal at a prescribed frequency to the circuit including the power receiving coil 21. The control unit 47 then reads the values of voltages V1 and V2 obtained at the ADC ports 51A and 51B and calculates the Q value (step S104). Upon completion of the Q value calculation, the control unit 47 turns off the third switches 45 (45A to 45C) and turns on the second switch 44.

The control units 47 on the secondary sides B and C each decide that the ID number included in the Q-value measurement command differs from the ID number assigned to the relevant power receiving device, and turn on the first switch 43 and store charge in the capacitor 42 to assure the power supply (steps S105b and S105c).

Thus, even if an ID number of a secondary side is not specified, the secondary side receives the Q-value measurement command. By comparison, in related art, a secondary side that has not been specified with its ID number does not receive the Q-value measurement command.

When the primary side restarts power transmission after the elapse of a fixed time (step S106), the control unit 47 on primary side A specified with its ID number compares the measured Q value with the threshold to decide whether there is metallic foreign matter and replies to the power transmitting device 10A with the decision result (step S107). The control unit 34 on the primary side receives the decision result (step S108).

Similarly, secondary sides B and C are specified with their ID numbers and a Q-value measurement command is transmitted to them. On secondary sides B and C as well, electric power stored in the capacitor 42 is used to carry out metallic foreign matter detection through Q-value measurement (step S109).

The control unit 34 on the primary side confirms that there is no metallic foreign matter on any of secondary sides A to C, after which the control unit 34 transmits a charging command with an ID number of 01 specified (step S110). Secondary side A specified with its ID number receives this charging command (step S111) and executes charging as commanded (step S112).

The control unit 34 on the primary side then transmits a charging command with an ID number of 02 specified (step S113) and specified secondary side B executes charging (steps S114 and S115).

The control unit 34 on the primary side further transmits a charging command with an ID number of 03 specified (step S116) and specified secondary side C executes charging (steps S117 and S118).

Then, the primary side and secondary sides A to C repeat metallic foreign matter detection through Q-value measurement at fixed intervals (step S119).

Figure 14:
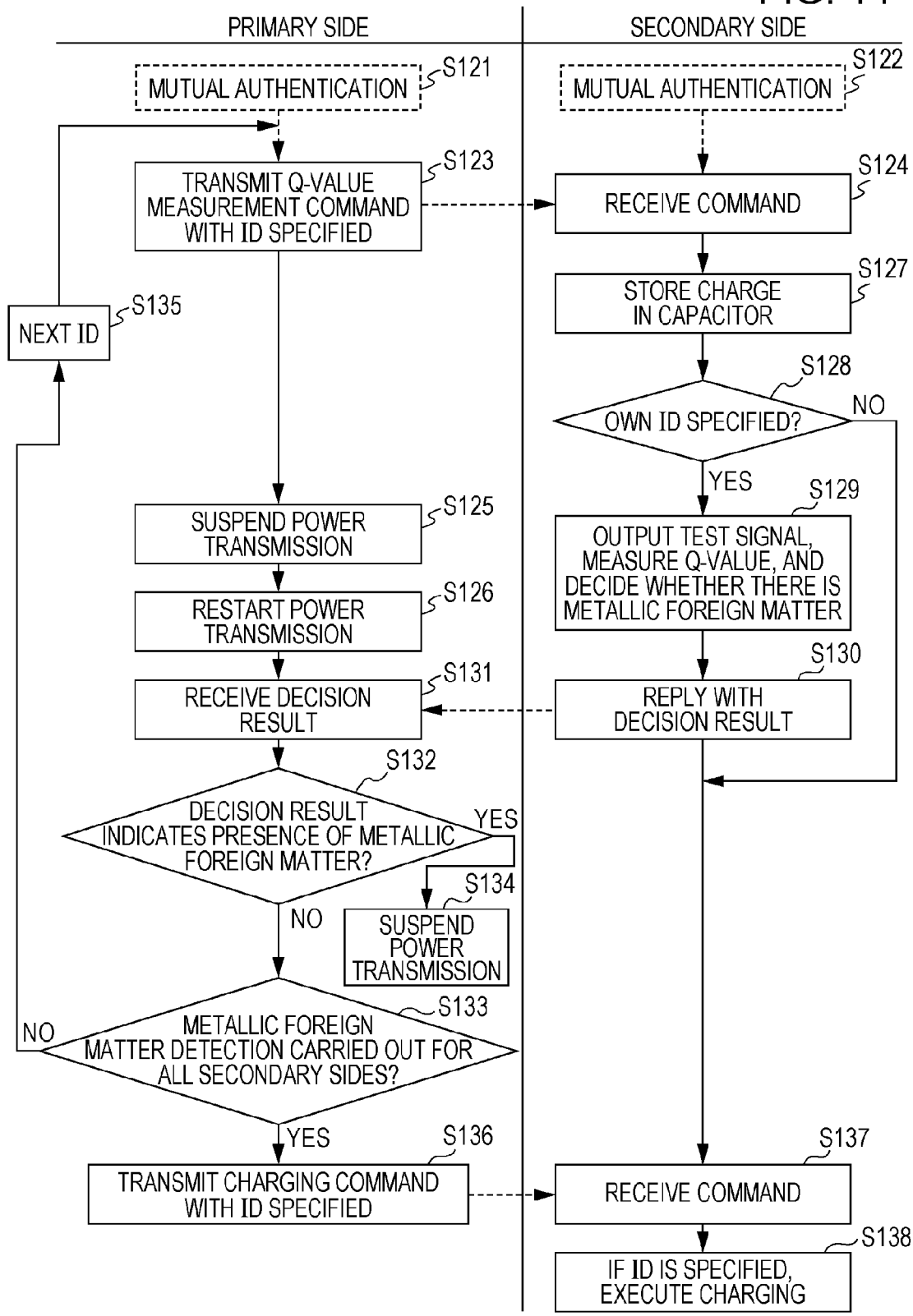
FIG. 14 is a flowchart illustrating a one-to-one operation example between a power transmitting device (primary side) and a power receiving device (secondary side) during multiple power transmission in the first embodiment of the present disclosure.

FIG. 14 is a flowchart illustrating a one-to-one operation example between the primary side (power transmitting device) and a secondary side (power receiving device) during multiple power transmission in the first embodiment of the present disclosure.

First, mutual authentication is carried out between the primary side and the secondary side (steps S121 and S122). Mutual authentication in steps S121 and S122 correspond to processing in steps S31 to S46 in FIG. 11.

After mutual authentication, the control unit 34 on the primary side transmits a Q-value measurement command with an ID number specified through the communication unit 33 (step S123). The control unit 47 on the secondary side receives this Q-value measurement command (step S124).

After having transmitting the Q-value measurement command, the control unit 34 on the primary side temporarily suspends power transmission (step S125), and then restarts power transmission after the elapse of a fixed time (step S126).

Before the primary side suspends power transmission, the control unit 47 on the secondary side turns on the first switch 43 to store charge in the capacitor 42 (step S127). The control unit 47 compares the ID number included in the Q-value measurement command with the ID number assigned to the power receiving device to decide whether the ID number of the power receiving device has been specified (step S128). If the ID number of the power receiving device has not been specified, the sequence proceeds to step S137.

If it is decided in step S128 that the ID number assigned to the power receiving device has been specified, the control unit 47 uses electric power stored in the capacitor 42 to turn on the third switches 45 (45A to 45C) and turn off the second switch 44, and supplies a test signal at a resonance frequency to the circuit including the power receiving coil 21. The control unit 47 then compares the Q value calculated from the values of voltages V1 and V2 obtained at the ADC ports 51A and 51B with the threshold to decide whether there is metallic foreign matter (step S129). At that time, power transmission by the primary side has been suspended.

The control unit 47 on the secondary side specified with its ID number replies to the primary side with the decision result as to whether there is metallic foreign matter (step S130). The control unit 34 on the primary side receives the decision result (step S131).

The control unit 34 on the primary side decides whether decision result indicates presence of metallic foreign matter (step S132). If the decision result indicates presence of metallic foreign matter, the control unit 34 on the primary side suspends power transmission (step S134).

If the decision result in step S132 indicates that there is no metallic foreign matter, the control unit 34 on the primary side decides whether metallic foreign matter detection has been carried out for all the mutually authenticated secondary sides (step S133). If there is a secondary side on which metallic foreign matter detection has not been carried out, the control unit 34 on the primary side increments the ID number and the sequence returns to step S123 at which the control unit 34 transmits a Q-value measurement command (step S135).

If the decision result in step S133 indicates that metallic foreign matter detection has been carried out for all the secondary sides and all the secondary sides are free from metallic foreign matter, these secondary sides are charged. That is, the control unit 34 on the primary side transmits a charging command with an ID specified (step S136).

The control unit 47 on the secondary side receives the charging command transmitted from the primary side (step S137). If the control unit 47 on the secondary side decides that the ID number assigned to the power receiving device, the control unit 47 carries out charging as commanded (step S138).

The control unit 47 repeats processing in step S136 to S138 to transmit a charging command with an ID number specified until all the secondary sides have been charged.

According to this embodiment, a Q-value measurement command is transmitted from the primary side to the secondary side and the secondary side measures the Q value; to assure the power source, the secondary side stores charge in the capacitor and measures the Q value when its ID number is specified, but only stores charges in the capacitor when its ID number is not specified. ID numbers are successively specified for a plurality of secondary sides, and the Q value is measured on one secondary side at a time.

In this arrangement, the Q-value measurement commands transmitted from the primary side are recognized for all the plurality of secondary sides and charge is stored in the capacitor, assuring the power supply on all the secondary sides. Therefore, ID number acquisition and authentication are not carried out again.

Accordingly, multiple power transmission can be carried out without redoing ID number acquisition from each secondary side and procedures for authentication and the like, shortening the processing time in multiple power transmission.

3. Second Embodiment

A second embodiment is an example in which after the primary side has transmitted Q-value measurement commands, all the secondary sides concurrently store charge in the capacitor and measure the Q value.

Figure 15:
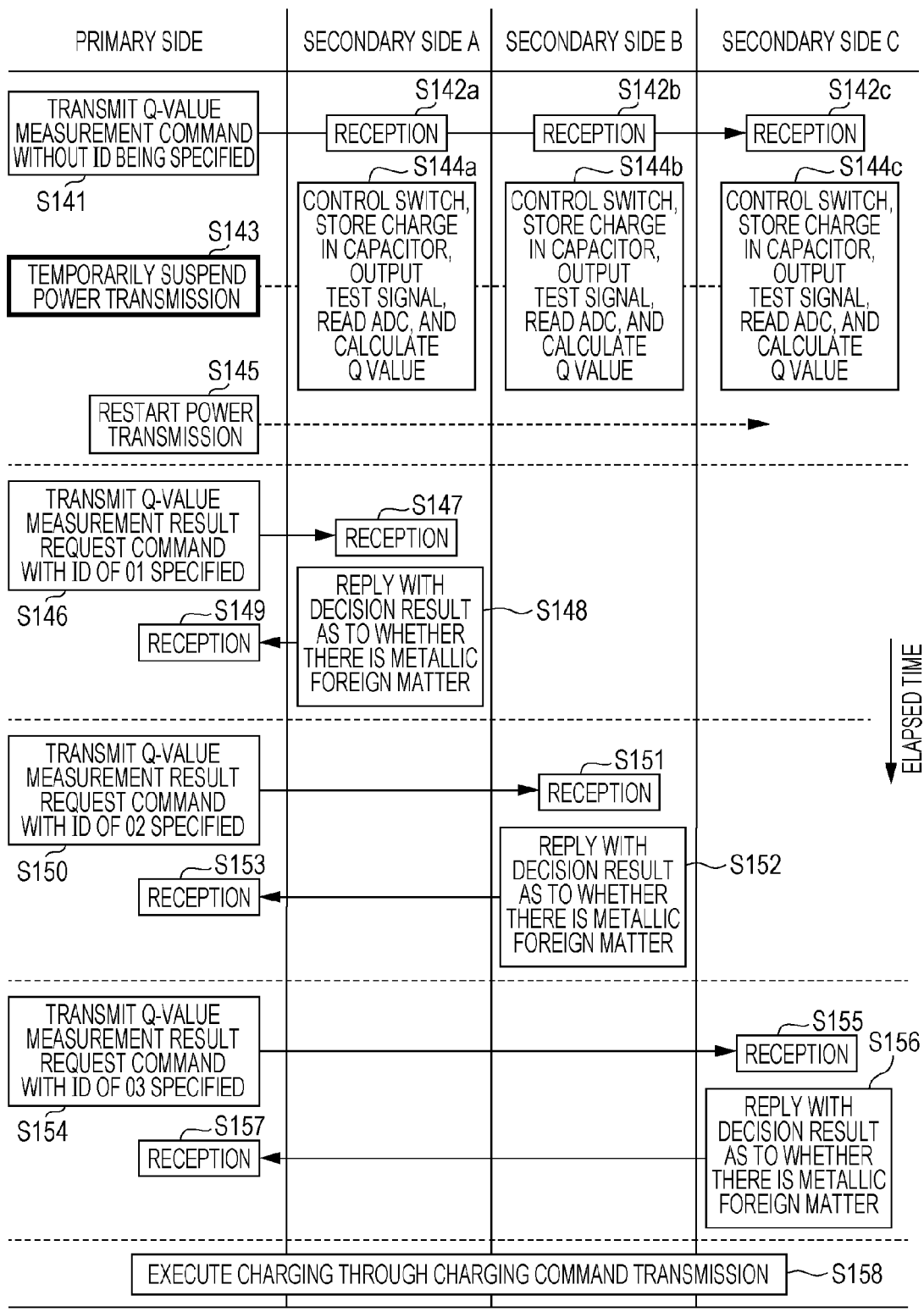
FIG. 15 is a sequence diagram illustrating an example of Q-value measurement during multiple power transmission in a second embodiment of the present disclosure.

FIG. 15 is a sequence diagram illustrating an example of Q-value measurement during multiple power transmission in the second embodiment of the present disclosure. The sequence in FIG. 15 will be described, focusing on differences from the sequence in FIG. 13 in the first embodiment. In the description below as well, mutual authentication between the primary side and secondary sides A to C is assumed to have been completed.

Upon completion of mutual authentication between the primary side and secondary sides A to C, the control unit 34 on the secondary side first transmits a Q-value measurement command without an ID number being specified through the communication unit 33 (step S141). The control units 47 in secondary sides A to C receive this Q-value measurement command (steps S142a, S142b, and S142c).

After transmitting the Q-value measurement command, the control unit 34 on the primary side temporarily suspends power transmission (step S143).

Even without an ID number being specified in the Q-value measurement command, the control units 47 on the secondary sides A to C store charge in the capacitor and measure the Q value. This is the greatest difference from the first embodiment.

The control units 47 on the secondary sides A to C carry out the same processing as in step S104 in FIG. 13 to store charge in the capacitor 42 and measure the Q value before the primary side suspends power transmission (steps S144a to 144c). Upon completion of Q-value calculation, the control units 47 turn of the third switches 45 and turn on the second switch 44.

The primary side restarts power transmission after the elapse of a fixed time (step S145). After the restart of the power transmission, the control unit 34 on the primary side transmits a Q-value measurement result request command with an ID number of 01 specified (step S146). Secondary side A specified with its ID number receives the Q-value measurement result request command (step S147) and replies to the primary side with a decision result as to whether there is metallic foreign matter (step S148). The control unit 34 on the primary side receives this decision result (step S149).

Next, the control unit 34 on the primary side transmits a Q-value measurement result request command with an ID number of 02 specified (step S150). Specified secondary side B replies to the primary side with a decision result as to whether there is metallic foreign matter according to the Q-value measurement result request command (steps S151 and S152). The control unit 34 on the primary side receives this decision result (step S153).

As for secondary side C as well, the control unit 34 on the primary side similarly specifies an ID number of 03 and acquires a decision result as to whether there is metallic foreign matter (steps S154 to S157).

After that, secondary sides A to C are charged through communication based on charging commands as in steps S110 to S118 in FIG. 13 (step S158).

Then, the primary side and secondary sides A to C repeat metallic foreign matter detection through Q-value measurement at fixed intervals as in step S119 in FIG. 13.

Figure 16:
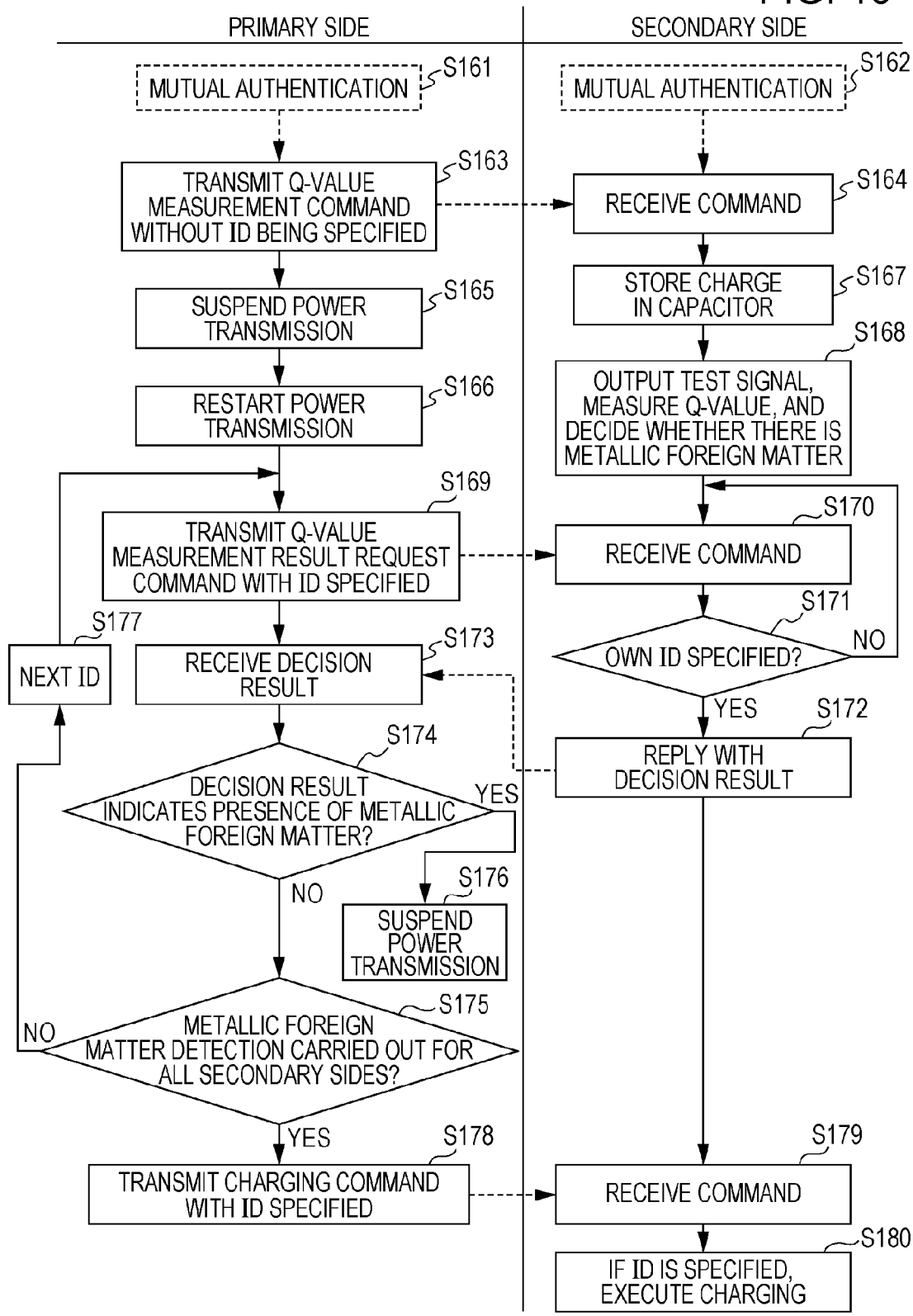
FIG. 16 is a flowchart illustrating a one-to-one operation example between the power transmitting device (primary side) and the power receiving device (secondary side) during multiple power transmission in the second embodiment of the present disclosure.

FIG. 16 is a flowchart illustrating a one-to-one operation example between the primary side (power transmitting device) and the secondary side (power receiving device) during multiple power transmission in the second embodiment of the present disclosure.

First, mutual authentication is carried out between the primary side and the secondary side as in steps S121 and S122 in FIG. 13 (steps S161 and S162).

After mutual authentication, the control unit 34 on the primary side transmits a Q-value measurement command without an ID number being specified through the communication unit 33 (step S163). The control unit 47 on the secondary side receives this Q-value measurement command (step S164).

After having transmitting the Q-value measurement command, the control unit 34 on the primary side temporarily suspends power transmission (step S165), and then restarts power transmission after the elapse of a fixed time (step S166).

Before the primary side suspends power transmission, the control unit 47 on the secondary side turns on the first switch 43 to store charge in the capacitor 42 (step S167).

Next, regardless of whether the ID number assigned to the power receiving device has been specified, the control unit 47 on the secondary side uses electric power stored in the capacitor 42 to turn on the third switches 45 (45A to 45C) and turn off the second switch 44, and supplies a test signal at a resonance frequency to the circuit including the power receiving coil 21. The control unit 47 then compares the Q value calculated from the values of voltages V1 and V2 obtained at the ADC ports 51A and 51B with the threshold to decide whether there is metallic foreign matter (step S168).

After the restart of the power transmission, the control unit 34 on the primary side transmits a Q-value measurement result request command with an ID number specified (step S169).

The control unit 47 on the secondary side receives the Q-value measurement command transmitted from the primary side (step S170). The control unit 47 on the secondary side compares the ID number included in the Q-value measurement result request command with the ID number assigned to the power receiving device to decide whether the ID number of the power receiving device has been specified (step S171). If the ID number of the power receiving device has not been specified, the sequence returns to step S170.

The control unit 47 on the secondary side specified with its ID number replies to the primary side with the decision result as to whether there is metallic foreign matter (step S172). The control unit 34 on the primary side receives the decision result (step S173).

The control unit 47 on the primary side carries out processing in steps S132 to S134 in FIG. 14 according to the decision result (steps S174 to S176). If it is decided in step S175 that there is a secondary side on which metallic foreign matter detection has not been carried out, the control unit 47 increments the ID number (step S177) and the sequence returns to step S169 at which the control unit 47 transmits a Q-value measurement result request command.

If the decision result in step S175 indicates that metallic foreign matter detection has been carried out for all secondary sides and all the secondary sides are free from metallic foreign matter, these secondary sides are charged. That is, processing in steps S178 to S180 is performed as in steps S136 to S138 in FIG. 14.

According to this embodiment, all the secondary sides that have received a Q-value measurement command concurrently store charge in the capacitor and measure the Q value, so even if the primary side temporarily suspends power transmission, the power supplies on the secondary sides are assured. Accordingly, multiple power transmission can be carried out without redoing ID number acquisition from each secondary side and procedures for authentication and the like, shortening the processing time of multiple power transmission.

Q-value measurement result request commands are transmitted to the secondary sides without IDs being specified, and all the secondary sides concurrently measure the Q value. The secondary sides successively reply to the primary side with a decision result, with the relevant ID number specified, as to whether there is metallic foreign matter. This method is effective when a plurality of secondary sides can accurately measure the Q value without interference among test signals supplied by them.

4. Others

First Example

Although, in the first and second embodiments described above, the detecting unit (Q-value measurement circuit 40) in the power receiving device 20A obtains the Q value from voltage V1 across the coil and capacitor in the resonance circuit and voltage V2 across the coil, this is not a limitation; the Q value may be obtained from the half-power method.

Figure 17:
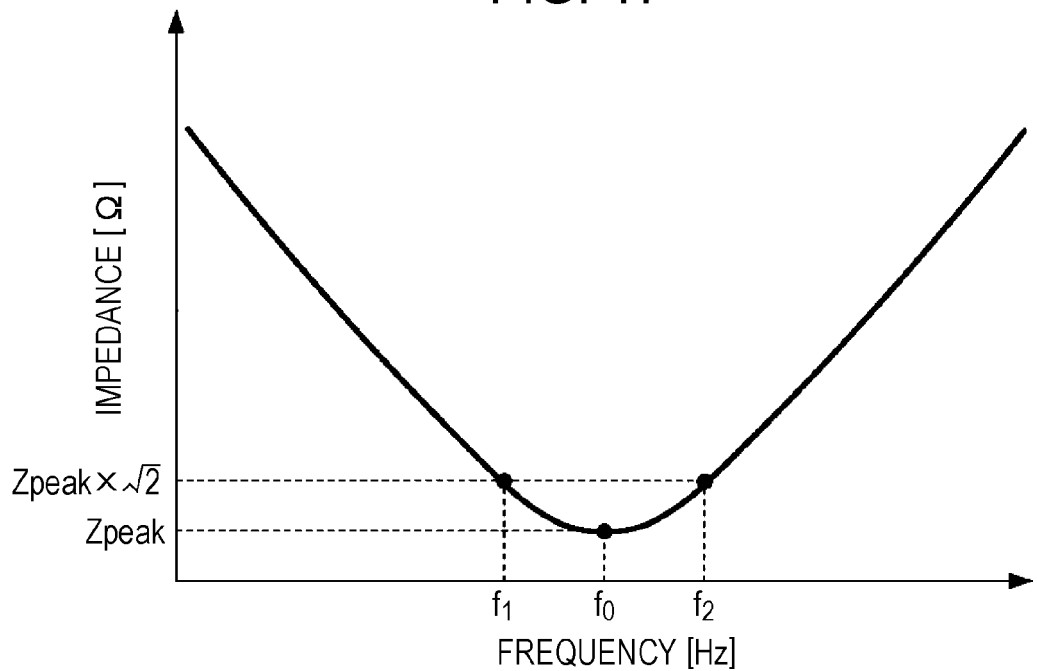
FIG. 17 is a graph illustrating the frequency characteristics of impedance in a series resonance circuit.

In the half-power method, when a series resonance circuit is formed, the Q value is obtained from a band (from frequency f1 to frequency f2) within which impedance is at most √2 times the absolute value of the impedance (Zpeak) at resonance frequency f0 (see the graph in FIG. 17) according to equation (2) below.

$$Q = \frac{f_0}{f_2 - f_1} \qquad (2)$$

Figure 18:
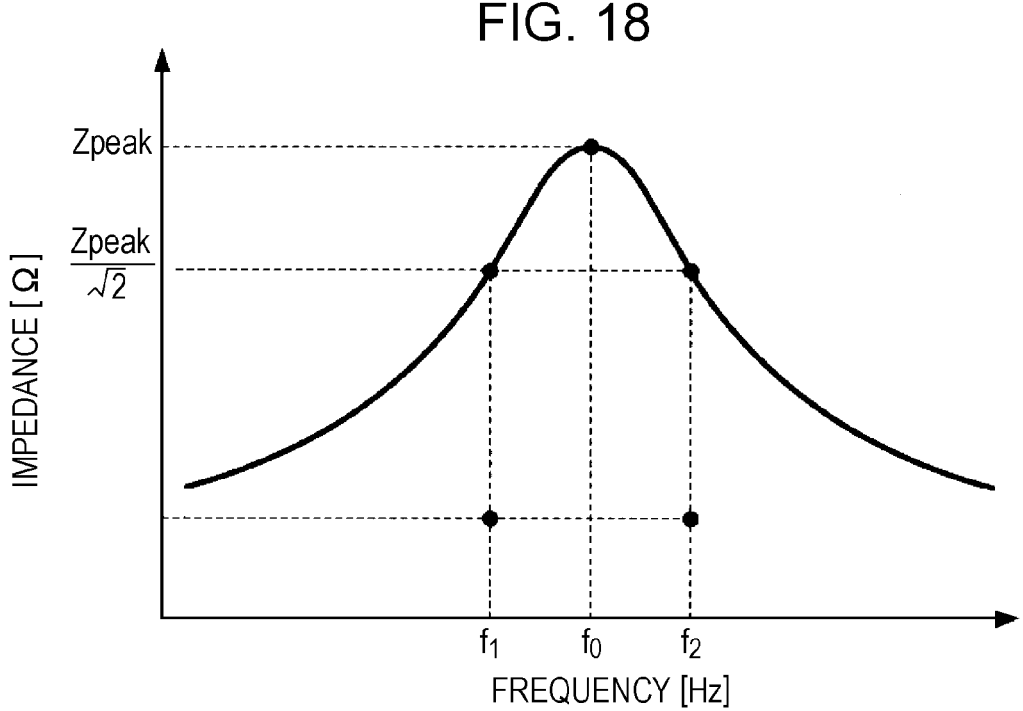
FIG. 18 is a graph illustrating the frequency characteristics of impedance in a parallel resonance circuit.

When a parallel resonance circuit is formed, the Q value is obtained from a band (from frequency f1 to frequency f2) within which impedance is at least 1/√2 times the absolute value of the impedance (Zpeak) at resonance frequency f0 (see the graph in FIG. 18) according to equation (2) above.

Second Example

In this example, unlike the first and second embodiments described above, the processing unit 52 calculates the Q value from the ratio of the real part of impedance to its imaginary part. Specifically, in this example, a self-balancing bridge circuit and a vector ratio detector are used to obtain the ratio of the real part of impedance to its imaginary part.

Figure 19:
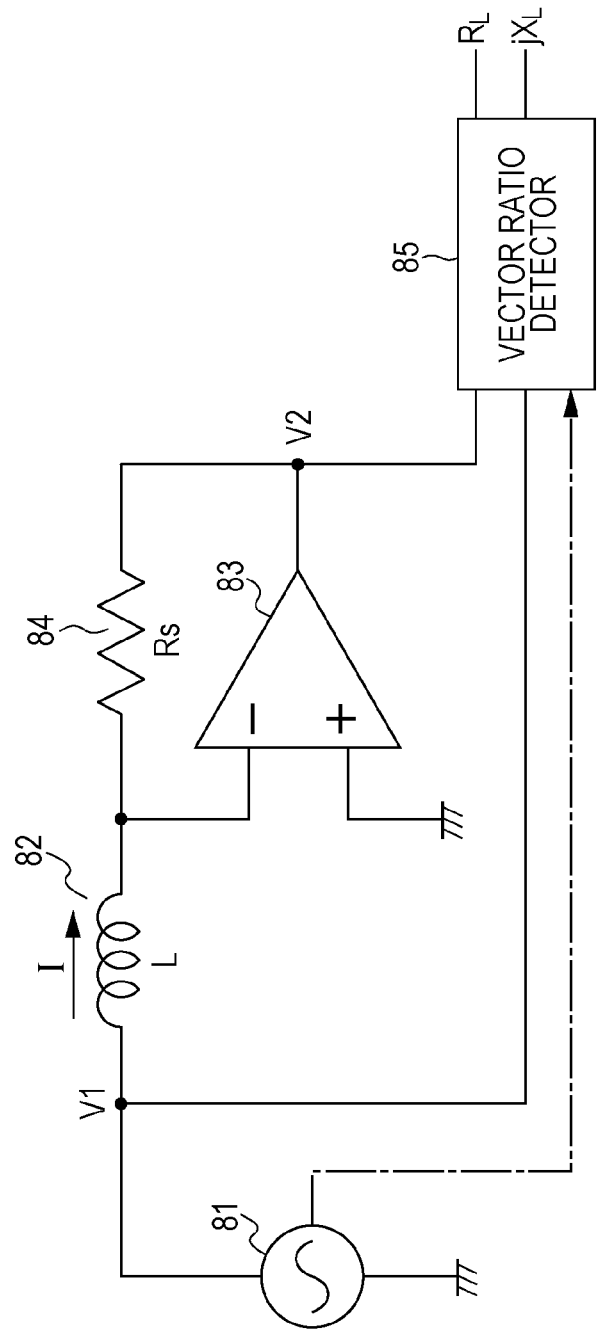
FIG. 19 is illustrates a circuit used to calculate the Q value from the ratio of the real part of impedance to its imaginary part.

FIG. 19 is illustrates a self-balancing circuit used to calculate the Q value from the ratio of the real part of impedance to its imaginary part.

The self-balancing circuit 80 illustrated in FIG. 19 has the same structure as a general inverting amplification circuit. A coil 82 is connected to an inverting input terminal (−) of an inverting amplifier 83 and its non-inverting input terminal (+) is connected to ground. A feedback resistive element 84 is used to apply negative feedback from the output terminal of the inverting amplifier 83 to its inverting input terminal (−). An output (voltage V1) from an alternating power supply 81 that supplies an alternating signal to the coil 82 and an output (voltage V2) from the inverting amplifier 83 are input to a vector ratio detector 85. The coil 82 corresponds to the power receiving coil 21 in FIG. 7.

The self-balancing circuit 80 operates so that the voltage at the inverting input terminal (−) is kept at zero due to the effect of negative feedback. Almost all of the current that has flowed from the alternating power supply 81 into the coil 82 flows into the feedback resistive element 84 because the input impedance of the inverting amplifier 83 is large. As a result, the voltage across the coil 82 becomes substantially the same as voltage V1 of the alternating power supply 81, and the output voltage of the inverting amplifier 83 becomes the product of a current I flowing into the coil 82 and a feedback resistance Rs. The feedback reference Rs is a reference resistance, the value of which is already recognized. Therefore, when voltages V1 and V2 are detected and their ratio is calculated, impedance is obtained. Since the vector ratio detector 85 detects voltages V1 and V2 as complex numbers, it uses phase information (represented by dash-dot lines in FIG. 19) of the alternating power supply 81.

In this example, the real part RL and imaginary part XL of impedance ZL of the resonance circuit are obtained by using the self-balancing circuit 80 and vector ratio detector 85 described above and the Q value is obtained from their ratio. Equations (3) and (4) below represent calculation processes to obtain the Q value.

$$Z_L = R_L + jX_L = \frac{V1}{I} = \frac{V1}{V2} Rs \quad (3)$$

$$Q = \frac{X_L}{R_L} \quad (4)$$

Although, in the examples in the embodiments described above, the power receiving device has carried out Q-value measurement and metallic foreign matter detection, this is not a limitation. Information about voltages V1 and V2 measured by the power receiving device 20A, the frequency of the test signal used during measurement, and the Q-value threshold at that frequency may be transmitted to the power transmitting device 10A, and the control unit 34 in the power transmitting device 10A may calculate the Q value on the secondary side and may decide whether there is metallic foreign matter. In this arrangement, the processing load applied to the power receiving device is reduced.

In the examples of the embodiments described above, the wireless power transfer system has been assumed to be based on a magnetic resonance system. However, the present disclosure is not limited to the magnetic resonance system; it can also be applied to an electromagnetic induction system in which the value of the coupling coefficient K is set to a large value to reduce the Q value.

Although, in the examples of the embodiments described above, the power transmitting device 10A has had only a power transmission function and the power receiving device 20A has had only a power reception function, this is not a limitation. For example, the power transmitting device 10A may have a power reception function and may receive electric power from the outside through the power transmitting coil 11. Conversely, the power receiving device 20A may have a power transmission function and may transmit electric power to the outside through the power receiving coil 21.

Although, in the embodiments described above, the Q value at a resonance frequency has been measured, the frequency at which the Q value is measured may not match the resonance frequency. Even when the Q value is measured at a frequency that is not the resonance frequency but within an allowable range, the technology in the present disclosure can improve precision with which metallic foreign matter present between the power transmitting side and the power receiving side is detected.

When a metal or another conductor comes close to the power transmitting coil 11 or power receiving coil 21, not only the Q value but also the L value change and the resonance frequency thereby shifts. However, an amount by which the resonance frequency has shifted due to the change in the L value may be used together with the Q value to detect an electromagnetically coupled state.

When metallic foreign matter is present between the power transmitting coil 11 and the power receiving coil 21, the value of the coupling coefficient k also changes. However, changes in the value of the coupling coefficient k and the Q value may be used together to detect an electromagnetically coupled state.

Although, in the examples of the embodiments described above, neither the power transmitting coil 11 nor the power receiving coil 21 has had a core, coils wound on cores having a magnetized body may be used.

The embodiments of the present disclosure can also be applied to secondary mobile devices, mobile telephones, mobile players, digital still cameras, and other various devices that use electric power.

In the present disclosure, structures described below are also possible.

(1) An energy receiver comprising:

a power reception coil configured to wirelessly receive power from an energy transmitter;

a foreign object detector configured to detect a foreign object within a range of a wireless energy transmission of the energy transmitter; and an energy storage element configured to store power received from the energy transmitter after receiving a command related to detection of the foreign object.

(2) The energy receiver of (1), further comprising:

a control unit configured to supply power to the foreign object detector from the energy storage element when the energy transmitter is not transmitting power.

(3) The energy receiver of (2), wherein the control unit is configured to supply the power to the foreign object detector from the energy storage element after receiving data corresponding to identification information of the energy receiver.

(4) The energy receiver of (2),
wherein,
if the command includes identification information related to the energy receiver, the control unit causes (i) the energy storage element to store power, and (ii) the foreign object detector to search for the foreign object, and
if the command does not include identification information related to the energy receiver, the control unit only causes the energy storage element to store power.

(5) The energy receiver of (2),
wherein,
the foreign object detector is configured to use power stored in the energy storage element to detect the foreign object when the wireless energy transmission is suspended, and
the control unit is configured to cause a result generated by the foreign object detector to the energy transmitter when the wireless energy transmission is restarted after a suspension of the wireless energy transmission, the result related to whether the foreign object was detected by the foreign object detector.

(6) The energy receiver of (2), wherein the control unit is configured to cause the power received by the power reception coil from the energy transmitter to be supplied to a load connected to the energy receiver upon receipt of a charging command from the energy transmitter.

(7) The energy receiver of (2), wherein the control unit, upon receipt of the command, is configured to cause (i) the energy storage element to store power, and (ii) the foreign object detector to search for the foreign object.

(8) The energy receiver of (1), wherein the energy storage element is a capacitor or a small secondary battery.

(9) The energy receiver of (1), wherein the foreign object detector is a Q-value measurement circuit configured to detect a quality factor related to a resonance circuit.

(10) The energy receiver of (1), further comprising:
a memory configured to store identification information of the energy receiver.

(11) A detection method comprising:
transmitting a first command from an energy transmitter to identify one or more energy receivers operable to wirelessly receive power from the energy transmitter;
transmitting identification information from each of the one or more energy receivers to the energy transmitter upon receipt of the first command; and
transmitting a second command to activate a foreign object detection process configured to detect a foreign object within a range of a wireless energy transmission of the energy transmitter,
wherein each of the one or more energy receivers is configured to independently store power received from the energy transmitter in an energy storage element after receiving the second command to activate the foreign object detector process.

(12) The detection method of (11), further comprising:
powering the foreign object detection process using power stored by the energy storage element when the energy transmitter is not transmitting power.

(13) The detection method of (12), wherein the foreign object detection process is performed using a Q-value measurement circuit configured to detect a quality factor related to a resonance circuit.

(14) An energy transmitter comprising:
a power transmission coil configured to wirelessly transmit power to at least one energy receiver; and
a communication unit configured to activate a power storage process in the at least one energy receiver by transmitting a command to activate a foreign object detection process configured to detect a foreign object within a range of a wireless energy transmission of the energy transmitter.

(15) The energy transmitter of (14),
wherein,
the at least one energy receiver includes a plurality of energy receivers, and
the communication unit is configured to independently control each of the plurality of energy receivers using different identification information.

(16) The energy transmitter of (14), wherein the foreign object detection process is performed via a Q-value measurement circuit configured to detect a quality factor related to a resonance circuit.

(17) The energy transmitter of (14), wherein the energy transmitter is configured to transmit power during the power storage process for a fixed period of time required to store power to run the Q-value measurement circuit to perform a Q-value measurement.

(18) The energy transmitter of (17), wherein the energy transmitter is configured to temporarily suspend transmission of the power for a fixed period of time required for the Q-value measurement circuit to perform one Q-value measurement.

(19) A detection device comprising:
a foreign object detector configured to detect a foreign object within a range of a wireless transmission of power between an energy receiver and an energy transmitter; and
an energy storage element configured to store power received from the energy transmitter upon receipt of a command related to detection of the foreign object.

(20) The detection device of (19), further comprising:
a control unit configured to supply power to the foreign object detector from the energy storage element when the energy transmitter is not transmitting power.

(21) The detection device of (19), wherein the foreign object detector is a Q-value measurement circuit configured to detect a quality factor related to a resonance circuit.

(22) A power transmission system comprising:
an energy transmitter configured to couple with an energy receiver and wirelessly transmit power to the energy receiver;
a foreign object detector configured to detect a foreign object capable of interfering with transmission of the power; and
an energy storage element configured to store power received from the energy transmitter after receiving a command to activate the foreign object detector.

(23) The power transmission system of (22), further comprising:
a control unit configured to supply power to the foreign object detector from the energy storage element when the energy transmitter is not transmitting power.

(24) The power transmission system of (22), wherein the foreign object detector is a Q-value measurement circuit configured to detect a quality factor related to a resonance circuit.

Although a series of processing in the embodiments described above can be executed by hardware, part of the processing can also be executed by software. When software is used to execute part of the series of processing, it can be executed by a computer in which programs constituting the software have been embedded in dedicated hardware or by a computer in which programs executing various functions have been installed. For example, part of the series of processes can be executed by installing programs constituting desired software in, for example, a general-purpose personal computer.

A recording medium storing program code of software that implements the functions in the embodiments described above may be supplied to the system or device. It will be appreciated that the functions can also be executed when a computer (or a control unit such as a central processing unit (CPU) or the like) in the system or device reads out and executes the program code stored in the storage medium (such as a memory).

In this case, a flexible disk, hard disk, optical disk, magneto-optical disk, compact disc-read-only memory (CD-ROM), CD recordable (CD-R), magnetic tape, non-volatile memory card, or read-only memory (ROM) can be used, for example, as the recording medium used to supply the program code.

When the computer reads outs and executes the program code, the functions in the embodiments described above are implemented. In addition, an operating system (OS) or the like running on the computer executes part or all of the actual processing in response to instructions from the program code. A case in which the functions in the embodiments described above are executed by this processing is also included.

Processing steps, in this description, that describe time-series processing include not only processing that is performed in time series in the described order but also processing that is not necessarily performed in time series but performed in parallel or individually (parallel processing or processing by objects, for example).

It will be apparent that the present disclosure is not limited to the embodiments described above but other various types of application examples and variations are possible without departing from the intended scope of the present disclosure described in the claims.

That is, since the embodiments described above are preferable specific example in the present disclosure, various technically preferable restrictions are imposed. However, the technical range in the present disclosure is not limited to these embodiments unless there is a description that limits the present disclosure in the explanation. For example, materials used, the amount of use of these materials, processing time, processing orders, the numerical condition on parameters, and the like in the description below are only preferable examples. The dimensions, shapes, and positional relationships in the drawings used for explanation are schematically illustrated.

The present disclosure contains subject matter related to that disclosed in Japanese Priority Patent Application JP 2011-209241 filed in the Japan Patent Office on Sep. 26, 2011, the entire contents of which are hereby incorporated by reference.

What is claimed is:

1. An energy receiver comprising:
a power reception coil configured to wirelessly receive power from an energy transmitter;
an energy storage element configured to store the power received from the energy transmitter after receiving a command related to detection of a foreign object;
a memory configured to store a threshold of a Q value of the energy receiver to compare with a calculated Q value of the energy transmitter; and
a control unit configured to supply the received power to a load connected to the energy receiver upon receipt of a charging command from the enemy transmitter,
wherein the charging command is issued after the detection of the foreign object.

2. The energy receiver of claim 1, further comprising:
a foreign object detector configured to detect the foreign object within a range of a wireless energy transmission of the enemy transmitter; and
wherein the control unit is further configured to supply the power to the foreign object detector from the energy storage element in an event the energy transmitter is not transmitting the power.

3. The energy receiver of claim 2,
wherein the control unit is further configured to supply the power to the foreign object detector from the energy storage element after receiving data corresponding to identification information of the energy receiver.

4. The energy receiver of claim 2,
wherein,
if the command includes identification information related to the energy receiver, the control unit is further configured to cause (i) the energy storage element to store the power, and (ii) the foreign object detector to search for the foreign object, and
if the command does not include the identification information related to the energy receiver, the control unit is further configured to only cause the energy storage element to store the power.

5. The energy receiver of claim 2,
wherein,
the foreign object detector is further configured to use the power stored in the energy storage element to detect the foreign object in an event the wireless energy transmission is suspended, and
the control unit is further configured to send a result generated by the foreign object detector to the energy transmitter in an event the wireless energy transmission is restarted after a suspension of the wireless energy transmission, the result related to whether the foreign object was detected by the foreign object detector.

6. The energy receiver of claim 2,
wherein the control unit, upon receipt of the command, is further configured to cause (i) the energy storage element to store the power, and (ii) the foreign object detector to search for the foreign object.

7. The energy receiver of claim 1,
wherein the energy storage element is a capacitor or a small secondary battery.

8. The energy receiver of claim 2,
wherein the foreign object detector is a Q-value measurement circuit further configured to detect a quality factor related to a resonance circuit.

9. The energy receiver of claim 1,
wherein the memory is further configured to store identification information of the energy receiver.

* * * * *